(12) United States Patent
Fukutome et al.

(10) Patent No.: US 11,405,517 B2
(45) Date of Patent: Aug. 2, 2022

(54) IMAGE READING DEVICE AND IMAGE FORMING APPARATUS INCLUDING THE SAME

(71) Applicant: SHARP KABUSHIKI KAISHA, Sakai (JP)

(72) Inventors: Shohichi Fukutome, Sakai (JP); Hisashi Yamanaka, Sakai (JP); Reishi Aoki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/369,635

(22) Filed: Jul. 7, 2021

(65) Prior Publication Data
US 2022/0060595 A1    Feb. 24, 2022

(30) Foreign Application Priority Data
Aug. 18, 2020   (JP) .............................. JP2020-138255

(51) Int. Cl.
| H04N 1/04 | (2006.01) |
| H04N 1/00 | (2006.01) |
| H04N 1/10 | (2006.01) |
| H04N 1/03 | (2006.01) |
| H04N 1/028 | (2006.01) |

(52) U.S. Cl.
CPC ..... *H04N 1/00708* (2013.01); *H04N 1/00816* (2013.01); *H04N 1/02815* (2013.01); *H04N 1/03* (2013.01); *H04N 1/1061* (2013.01)

(58) Field of Classification Search
None
See application file for complete search history.

(56) References Cited

U.S. PATENT DOCUMENTS

| 2016/0057294 | A1* | 2/2016 | Kobayashi | H04N 1/00753 358/449 |
| 2016/0065778 | A1* | 3/2016 | Yamada | H04N 1/00708 358/488 |
| 2018/0176400 | A1* | 6/2018 | Shimizu | H04N 1/00005 |
| 2018/0288253 | A1* | 10/2018 | Maeda | H04N 1/1061 |
| 2021/0400160 | A1* | 12/2021 | Harada | H04N 1/00 |

FOREIGN PATENT DOCUMENTS

JP    2018-107572 A    7/2018

* cited by examiner

*Primary Examiner* — Cheukfan Lee
(74) *Attorney, Agent, or Firm* — ScienBiziP, P.C.

(57) ABSTRACT

In an image reading device including a document platen, a document holder, multiple light sources, and a close contact type image sensor, the light sources are sequentially turned on and the image sensor individually reads light of multiple different colors reflected from a document in a main scanning direction. When the document holder is opened, in an area determination process, a first scanning area where a difference between output values of the image sensor when the light sources are sequentially turned on is within a predetermined threshold value range, and a second scanning area where the difference is outside the predetermined threshold value range are determined in an entire scanning area of the image sensor. A document size in the main scanning direction is detected based on a position of a boundary in the main scanning direction between the first and second scanning areas determined in the area determination process.

7 Claims, 19 Drawing Sheets

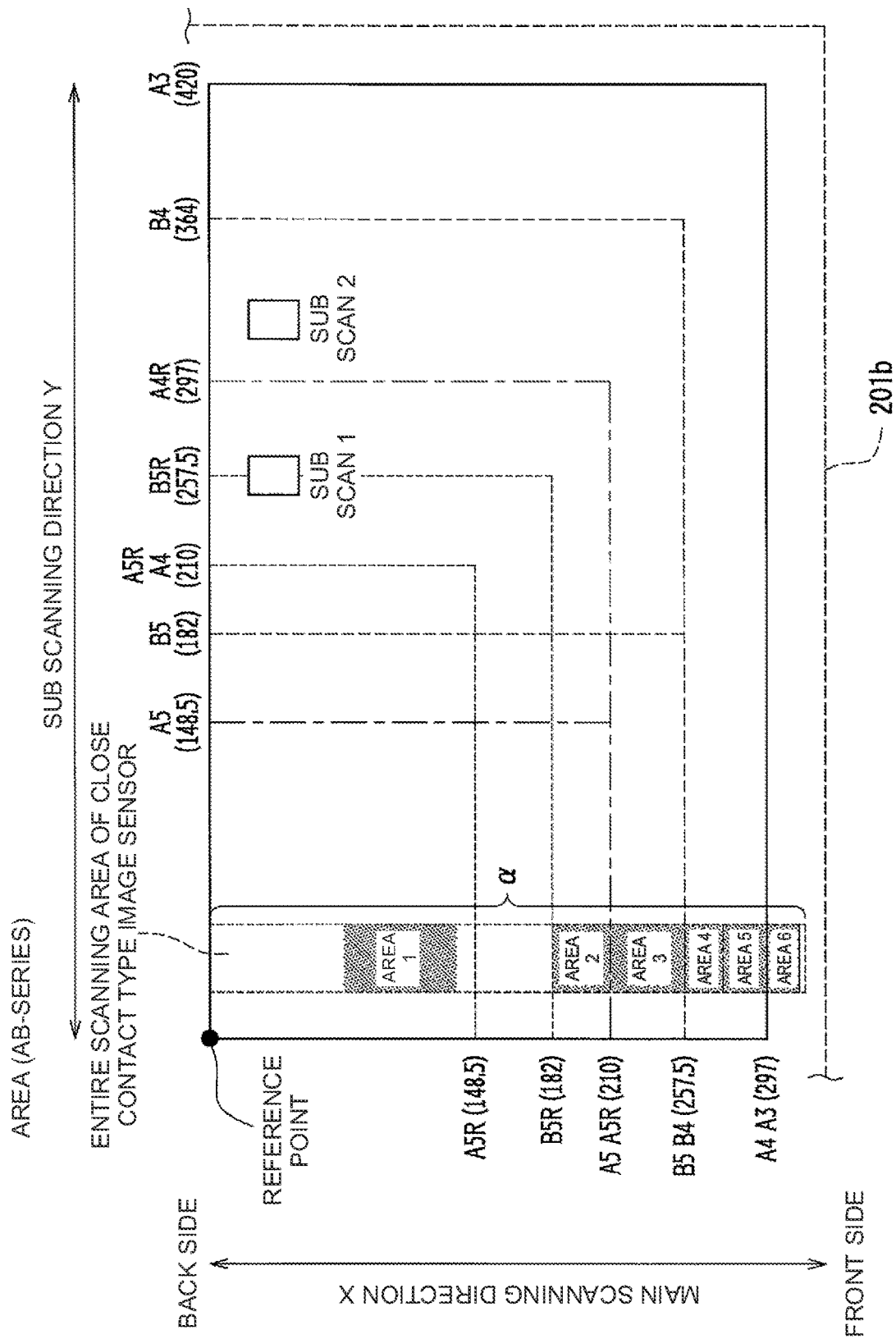

FIG. 7B

FIRST DETERMINATION TABLE TA1

| | A3 | B4 | A4 | A4R | B5 | B5R | A5 | A5R |
|---|---|---|---|---|---|---|---|---|
| MAIN SCAN | 297 | 257.5 | 297 | 210 | 257.5 | 182 | 210 | 148.5 |
| SUB SCAN | 420 | 364 | 210 | 297 | 182 | 257.5 | 148.5 | 210 |

| | A3 | B4 | A4 | A4R | B5 | B5R | A5 | A5R |
|---|---|---|---|---|---|---|---|---|
| AREA 1 | YES | YES | YES | YES | YES | YES | YES | YES |
| AREA 2 | YES | YES | YES | YES | YES | NO | YES | NO |
| AREA 3 | YES | YES | YES | NO | YES | NO | NO | NO |
| AREA 4 | YES | NO | YES | NO | NO | NO | NO | NO |
| AREA 5 | YES | NO | NO | NO | NO | NO | NO | NO |
| AREA 6 | NO | NO | NO | NO | NO | NO | NO | NO |

| | A3 | B4 | A4 | A4R | B5 | B5R | A5 | A5R |
|---|---|---|---|---|---|---|---|---|
| SUB SCAN 1 | ON | ON | OFF | ON | OFF | ON | OFF | OFF |
| SUB SCAN 2 | ON | ON | OFF | OFF | OFF | OFF | OFF | OFF |

YES: DOCUMENT PRESENT
NO: DOCUMENT NOT PRESENT

FIRST CURRENT RATIO TABLE TB1

|  | CURRENT RATIO OF LIGHT SOURCE | | |
|---|---|---|---|
|  | R1 | R2 | R3 |
| DURING NORMAL DOCUMENT READING | 100% | 100% | 100% |
| DURING DOCUMENT SIZE DETERMINATION PROCESS | 0% | 50% | 100% |

FIG. 11B

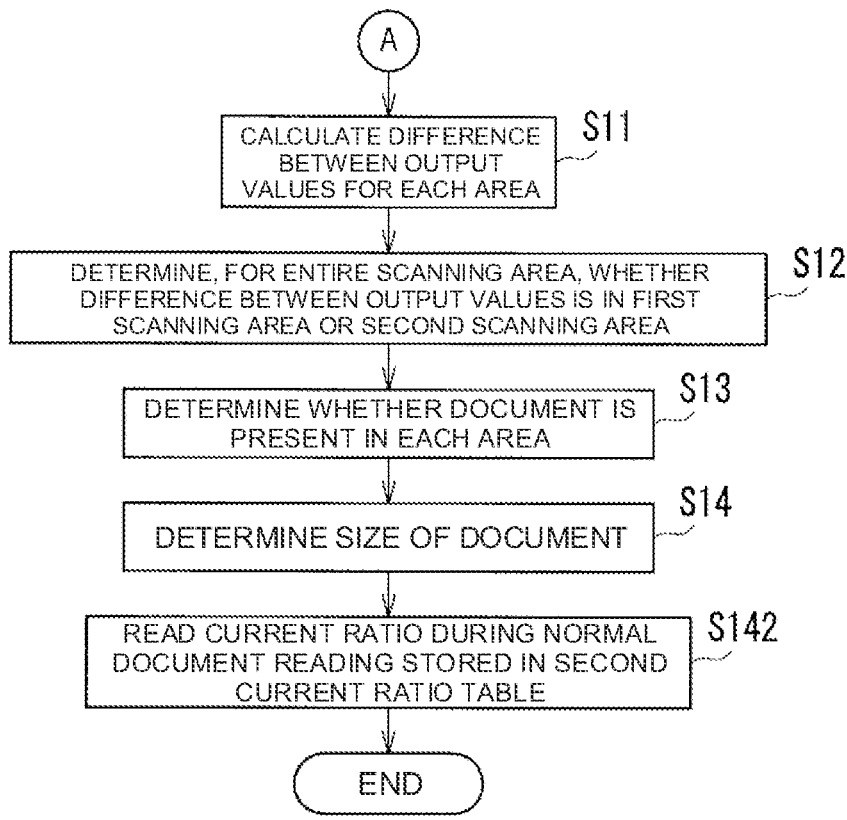

FIG. 11C

SECOND CURRENT RATIO TABLE TB2

|  | CURRENT RATIO OF LIGHT SOURCE | | |
|---|---|---|---|
|  | R1 | R2 | R3 |
| DURING NORMAL DOCUMENT READING | 100% | 100% | 100% |
| DURING DOCUMENT SIZE DETERMINATION PROCESS (FIRST TIME) | 0% | 50% | 100% |
| DURING DOCUMENT SIZE DETERMINATION PROCESS (SECOND TIME) | 100% | 50% | 0% |
| DURING DOCUMENT SIZE DETERMINATION PROCESS (THIRD TIME) | 50% | 0% | 100% |
| DURING DOCUMENT SIZE DETERMINATION PROCESS (FOURTH TIME) | 0% | 100% | 50% |
| DURING DOCUMENT SIZE DETERMINATION PROCESS (FIFTH TIME) | 100% | 0% | 50% |

FIG. 12B

SECOND DETERMINATION TABLE TA2

|  | 11×17 | 8.5×14 | 8.5×11 | 8.5×11R | 5.5×8.5 | 5.5×8.5R |
|---|---|---|---|---|---|---|
| MAIN SCAN | 297.9 | 215.9 | 279.4 | 215.9 | 215.9 | 139.7 |
| SUB SCAN | 431.8 | 355.6 | 215.9 | 279.4 | 139.7 | 215.9 |

|  | 11×17 | 8.5×14 | 8.5×11 | 8.5×11R | 5.5×8.5 | 5.5×8.5R |
|---|---|---|---|---|---|---|
| AREA 1 | YES | YES | YES | YES | YES | YES |
| AREA 2 | YES | YES | YES | YES | YES | NO |
| AREA 3 | YES | NO | YES | NO | NO | NO |
| AREA 4 | NO | NO | NO | NO | NO | NO |

|  | 11×17 | 8.5×14 | 8.5×11 | 8.5×11R | 5.5×8.5 | 5.5×8.5R |
|---|---|---|---|---|---|---|
| SUB SCAN 1 | ON | ON | OFF | ON | OFF | OFF |
| SUB SCAN 2 | ON | ON | OFF | OFF | OFF | OFF |

YES: DOCUMENT PRESENT
NO: DOCUMENT NOT PRESENT

IMAGE READING DEVICE AND IMAGE FORMING APPARATUS INCLUDING THE SAME

BACKGROUND OF THE INVENTION

Field of the Invention

The present invention relates to an image reading device for reading an image of a document and an image forming apparatus such as a copying machine, a multifunction machine, or a facsimile device.

Description of the Background Art

As an image reading device, an image reading device that detects a size of a document in a main scanning direction is known in the prior art (for example, Japanese Unexamined Patent Application Publication No. 2018-107572).

Specifically, the image reading device described in Japanese Unexamined Patent Application Publication No. 2018-107572 detects a light amount of each of a plurality of divided areas in the main scanning direction at predetermined time intervals, calculates a ratio of the light amount, based on a maximum value and a minimum value of the detected light amount of each of the divided areas, and detects the size of the document in the main scanning direction, based on the calculated ratio.

However, in the image reading device described in Japanese Unexamined Patent Application Publication No. 2018-107572, if the ratio of the light amount within a document area being an area where the document is placed in an area of a document platen, and outside the document area is similar, the size of the document in the main scanning direction cannot be accurately detected.

Therefore, an object of the present invention is to provide an image reading device and an image forming apparatus capable of accurately detecting the size of a document in the main scanning direction.

SUMMARY OF THE INVENTION

As a result of extensive studies to solve the above problems, the inventors have made the following discovery. That is, the inventors have found that in an image reading device that sequentially turns on a plurality of light sources to irradiate a document placed on a document platen and held by a document holder with light of different colors from the plurality of light sources, and individually reads, by a close contact type image sensor, light of a plurality of different colors reflected from the document in a main scanning direction, in a state where the document holder is opened, a difference between output values (an output balance degree being a degree of balance of the output values) of the close contact type image sensor when light of a plurality of different colors reflected from a document area being an area of the document placed on the document platen is individually sensed, is larger than a difference between output values (output balance degree) of the close contact type image sensor outside the document area (not balanced). The inventors have found that it is possible to accurately detect the size of the document in the main scanning direction by detecting a variation of these differences between the output values (output balance degree).

The present invention is based on these findings, and provides an image reading device and an image forming apparatus described below.

(1) Image Reading Device

An image reading device according to the present invention includes a document platen on which a document is placed, a document holder that holds the document placed on the document platen, a plurality of light sources that irradiate the document placed on the document platen with light of different colors, and a close contact type image sensor. The image reading device sequentially turns on the plurality of light sources and individually reads, by the close contact type image sensor, light of a plurality of different colors reflected from the document in a main scanning direction. In a state where the document holder is opened, the image reading device performs an area determination process to determine, in an entire scanning area of the close contact type image sensor, a first scanning area in which a difference between output values of the close contact type image sensor when the plurality of light sources are sequentially turned on is within a predetermined threshold value range, and a second scanning area in which the difference between the output values of the close contact type image sensor is outside the predetermined threshold value range, and the image reading device detects a size of the document in the main scanning direction, based on a position of a boundary in the main scanning direction between the first scanning area and the second scanning area determined in the area determination process.

(2) Image Forming Apparatus

An image forming apparatus according to the present invention includes the image reading device according to the present invention.

According to the present invention, it is possible to accurately detect the size of a document in a main scanning direction.

BRIEF DESCRIPTION OF THE DRAWINGS

FIG. 7A is an illustrative view illustrating a plurality of areas into which an entire scanning area of the close contact type image sensor is divided when an AB-series document size is detected.

FIG. 7B is a chart illustrating an example of a first determination table for determining an AB-series document size.

FIG. 11B is a flowchart illustrating a latter half of Control Example 3 of the document size determination process by the controller.

FIG. 11C is a chart illustrating a second current ratio table in which current ratios of a plurality of light sources are stored.

FIG. 12B is a chart illustrating an example of a second determination table for determining the inch-series document size.

DESCRIPTION OF THE PREFERRED EMBODIMENTS

Figure 1:
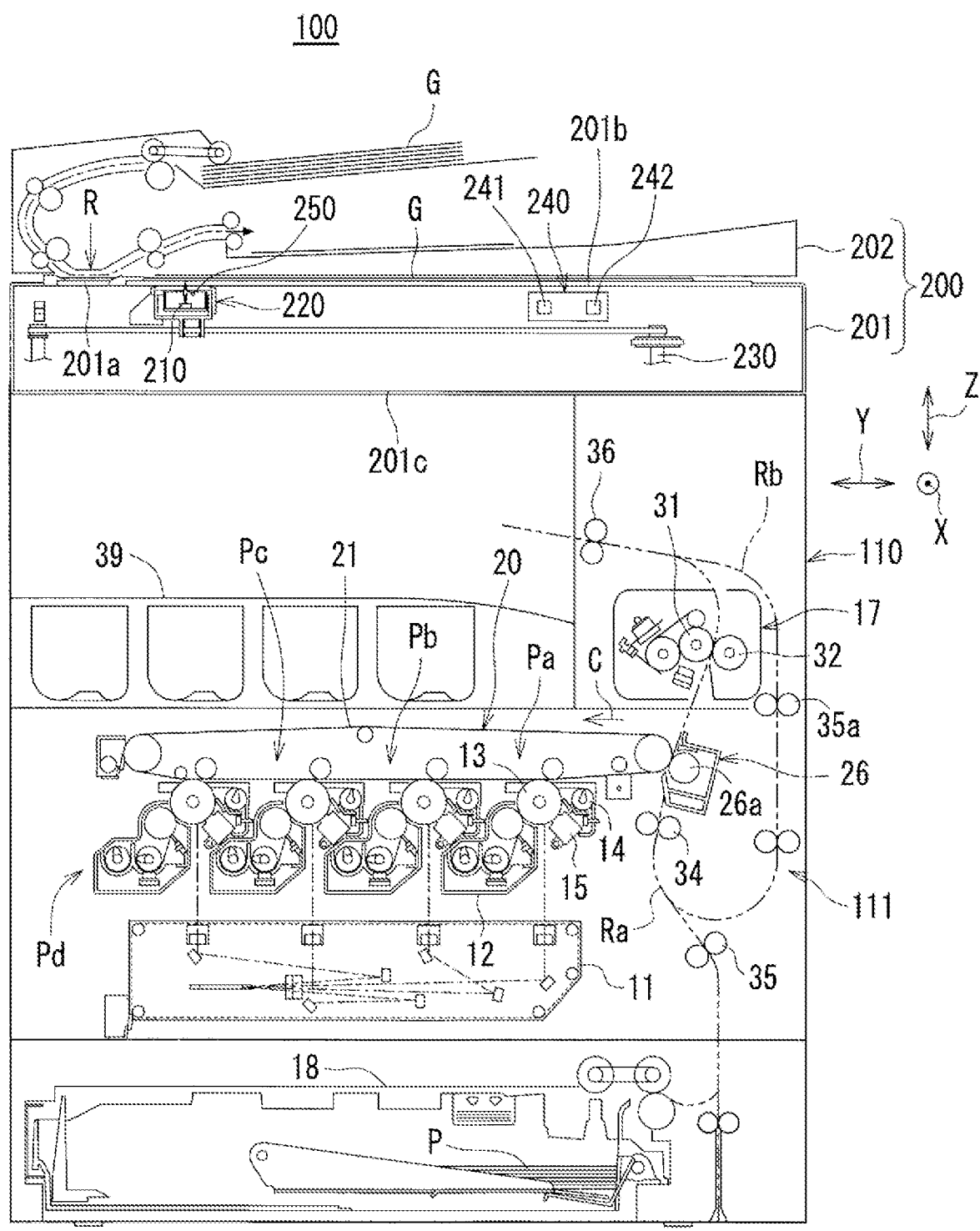
FIG. 1 is a front view illustrating a schematic configuration of an image forming apparatus including an image reading device according to an embodiment of the present invention.

An embodiment according to the present invention will be described below with reference to the drawings. In the following description, same parts are denoted by the same reference numerals. The names and functions of the same parts are also the same. Therefore, detailed description thereof will not be repeated.

Image Forming Apparatus

Figure 2:
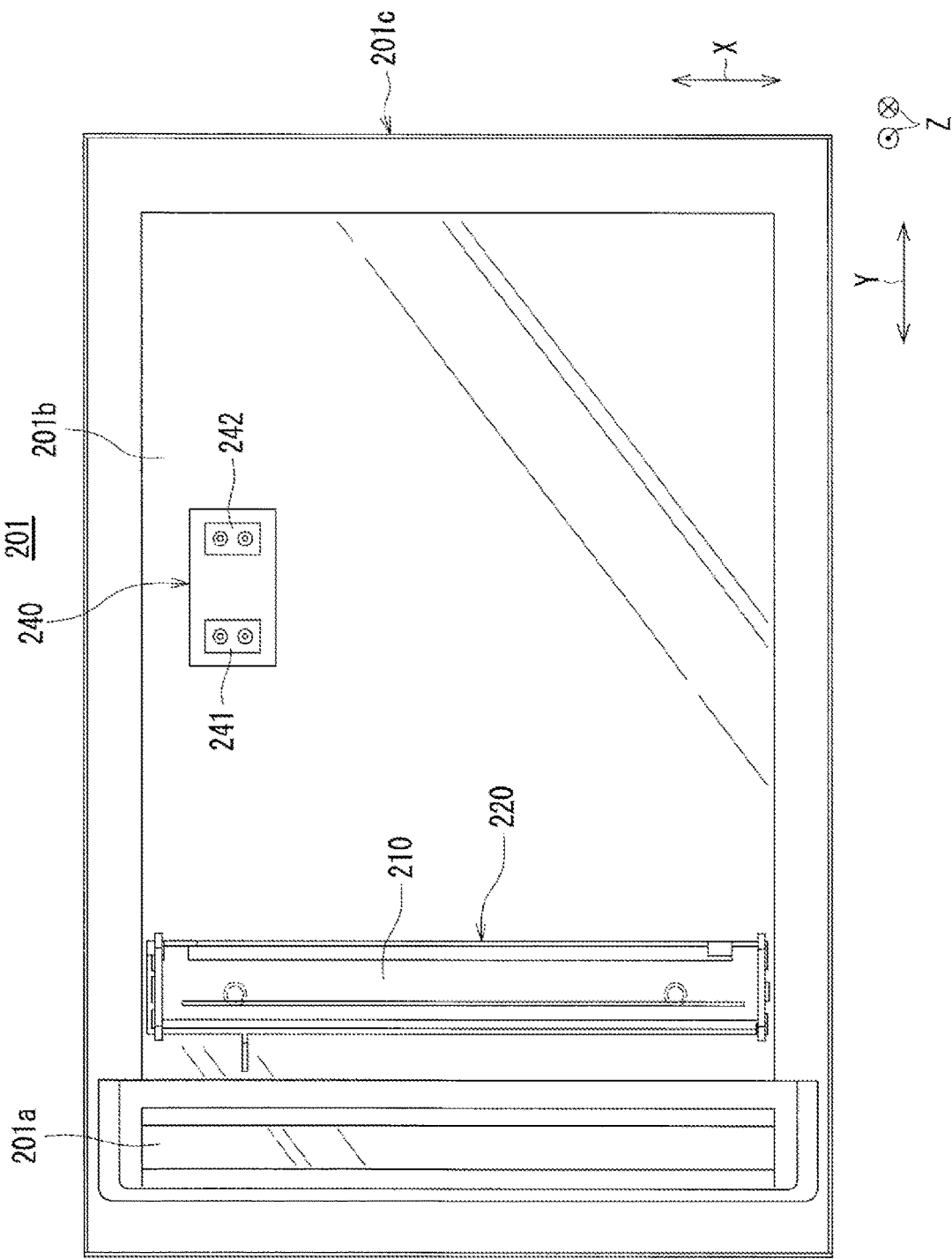
FIG. 2 is a schematic plan view of the image reading device illustrated in FIG. 1, as viewed from above.

FIG. 1 is a front view illustrating a schematic configuration of an image forming apparatus 100 including an image reading device 200 according to an embodiment of the present invention. FIG. 2 is a schematic plan view of the image reading device 200 illustrated in FIG. 1 as viewed from above.

The image forming apparatus 100 includes the image reading device 200 and an image forming apparatus main body 110.

The image reading device 200 is provided above the image forming apparatus main body 110, and includes an image reader 201 and a document conveyor 202 (automatic document feeding device). The image reader 201 includes a document platen 201b on which a document G is placed, and a document reading member 201a that defines a reading position R of the document G being conveyed. The image reader 201 reads an image of the document G placed on the document platen 201b, or reads an image of the document G conveyed by the document conveyor 202 at the reading position R of the document reading member 201a.

The document platen 201b is provided on an upper side of the image reader 201. The document conveyor 202 automatically conveys the document G toward the reading position R. The document conveyor 202 is provided to be pivotable (for example, axially supported by a hinge) around an axis along a sub scanning direction Y (a direction parallel to a paper conveyance direction), and can be opened and closed with respect to the image reader 201. That is, the document conveyor 202 exposes the document platen 201b to the above, but is also an example of a document holder that presses the document G placed on the document platen 201b from above. The document holder may be a document holding cover.

The image forming apparatus 100 includes an image former 111 that forms a polychromatic or a monochromatic image on a paper P (a recording sheet such as a recording paper) in accordance with an image of the document G read by the image reading device 200 or image data received from the outside, and an operation processor 112 that receives an input operation by an operator.

The image former 111 includes an optical scanning device 11, a developing device 12, a photosensitive drum 13, a drum cleaning device 14, a charger 15, an intermediate transfer belt device 20, a fixing device 17, and a secondary transfer device 26. Image data processed in the image forming apparatus 100 corresponds to a color image in which a plurality of colors (four colors in the present example) such as black (K), cyan (C), magenta (M), and yellow (Y) are used. Therefore, in the present example, the developing device 12 includes four developing devices 12, the photosensitive drum 13 includes four photosensitive drums 13, the drum cleaning device 14 includes four drum cleaning devices 14, and the charger 15 includes four chargers 15 to form four types of latent images according to each color, and each of the developing devices 12, the photosensitive drums 13, the drum cleaning devices 14, and the chargers 15 are set to black, cyan, magenta, and yellow to configure four image stations Pa, Pb, Pc, and Pd. The image forming apparatus 100 further includes a paper feed tray 18 and a discharge tray 39.

In the image forming apparatus 100, the paper P supplied by the paper feed tray 18 is conveyed along a paper conveyance path Ra to a paper stop roller 34. Next, the paper P is conveyed to a transfer roller 26a by the paper stop roller 34 at a timing when the paper P is aligned with a toner image on an intermediate transfer belt 21 moving by a circular movement in a circumferential direction C. Toner on the intermediate transfer belt 21 is transferred onto the paper P by the transfer roller 26a. After that, the paper P passes through a heat roller 31 and a pressure roller 32 in the fixing device 17, and is discharged onto the discharge tray 39 via a conveyance roller 35 and a discharge roller 36. If an image is formed not only on a front side of the paper P but also on a back side, the paper P is conveyed in a reverse direction from the discharge roller 36 to a reversal paper conveyance path Rb. The front and back sides of the paper P are reversed via reversal conveyance rollers 35a, and the paper P is guided again to the paper stop roller 34. Next, the paper P is discharged toward the discharge tray 39 after the toner image is formed and fixed on the back side in much the same way as on the front side.

Image Reading Device

Figure 3:
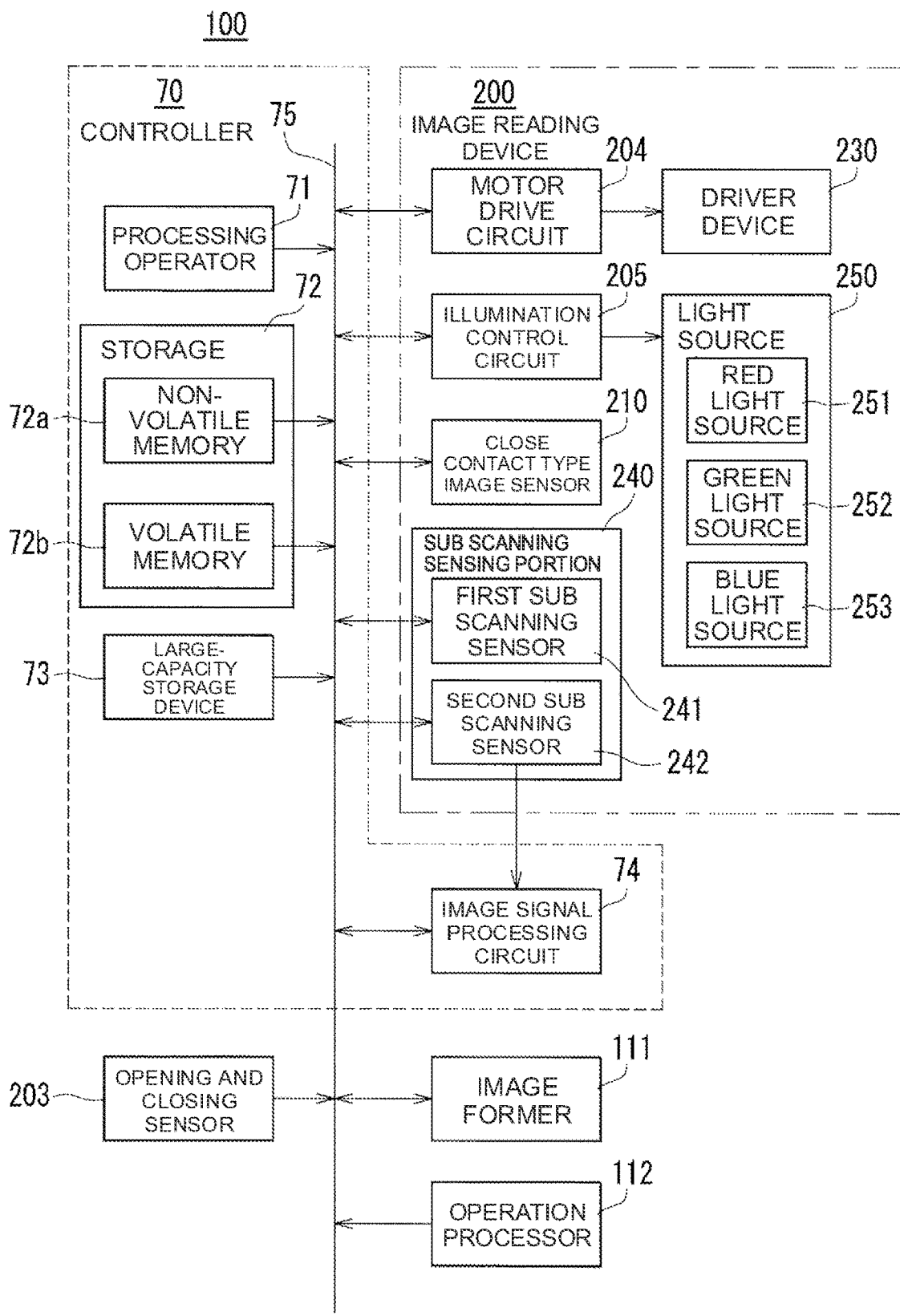
FIG. 3 is a schematic block diagram illustrating an example of a system configuration of the image forming apparatus illustrated in FIG. 1.

FIG. 3 is a schematic block diagram illustrating an example of a system configuration of the image forming apparatus 100 illustrated in FIG. 1. As illustrated in FIG. 3, the image forming apparatus 100 includes a controller 70. The controller 70 may be provided in the image reading device 200. The controller 70 includes a processing operator 71 including a microcomputer such as a central processing unit (CPU), and a storage 72 including a non-volatile memory 72a such as a read only memory (ROM) and a volatile memory 72b such as a random access memory (RAM). The controller 70 controls an operation of various types of constituent elements by loading onto the volatile memory 72b of the storage 72 and executing, a control program stored in advance in the non-volatile memory 72a of the storage 72 by the processing operator 71.

The controller 70 is connected to the storage 72, a large-capacity storage device 73 (a hard disk device in the present example), and an image signal processing circuit 74, via an internal bus 75. The large-capacity storage device 73 saves image data read by the image reader 201, image data transmitted from an external computer, and the like.

The controller 70 is connected to the image reading device 200, the image former 111, and the operation processor 112, via the internal bus 75.

The controller 70 manages an overall control of the image forming apparatus 100. The non-volatile memory 72a stores default values of an activation program and various types of information of the image forming apparatus 100. The volatile memory 72b is used as a working area and a buffer area of the controller 70. Here, the controller 70 uses the volatile memory 72b as a buffer area and a working area to control the entire image forming apparatus 100, and thus, in the controller 70, at least the controller 70 and the volatile memory 72b are also included in the image reading device 200.

The image signal processing circuit 74 performs a predetermined process on the image data read by the image reader 201 (image data based on an output of a close contact type image sensor 210). The image signal processing circuit 74 amplifies image signals of a plurality of colors for sensing (red (R), green (G), and blue (B) in the present example), which are output from the close contact type image sensor 210, and converts the amplified image signals by analog/digital (A/D) conversion. The image signal processing circuit 74 corrects the image data converted from an analog signal to a digital signal, by shading correction. Specifically, the image signal processing circuit 74 executes black shading correction using black correction data, and executes white shading correction using white correction data. The image signal processing circuit 74 converts colors of the image data after shading correction from the plurality of colors for sensing (red, green, and blue in the present example) into data of a plurality of colors for output (yellow (Y), magenta (M), cyan (C), and black (K) in the present example), and performs a process (post-processing) such as adjusting color gradation, to output the adjusted image data to the controller 70.

The controller 70 stores the image data output from the image signal processing circuit 74 in the large-capacity storage device 73, and controls the image former 111 to print a corresponding image on the paper P.

As illustrated in FIGS. 1 and 2, the image reading device 200 according to the present embodiment includes a scanning body 220 (scanner) including a single close contact type image sensor 210 (line sensor), and the document platen 201b on which the document G is placed. The image reading device 200 scans the document G placed on the document platen 201b while moving the scanning body 220 to one side of the sub scanning direction Y (right side in FIGS. 1 and 2), to read the image of the document G by the close contact type image sensor 210.

As illustrated in FIG. 1, the image reading device 200 includes the image reader 201 and the document conveyor 202 arranged on an upper surface of the image reader 201.

The document conveyor 202 is provided pivotably around a pivot axis along the sub scanning direction Y at a back side (opposite side of an operation side) being one side in a main scanning direction X with respect to the image reader 201 (a direction orthogonal to the paper conveyance direction) and if the document conveyor 202 is opened from a front side (the operation side), the document platen 201b in the image reader 201 is exposed.

The image reader 201 includes the document reading member 201a (specifically, a document reading glass) that is transparent and shaped as a flat plate, the document platen 201b (specifically, a document placement glass) that is transparent and shaped as a flat plate, the scanning body 220, a driver device 230 (scanner motor), and a housing 201c.

The scanning body 220 is reciprocally movable with respect to the housing 201c along the sub scanning direction Y, below the document reading member 201a and the document platen 201b, and is driven by the driver device 230.

The image reading device 200 performs a moving document reading operation and a fixed document reading operation, by an instruction of the controller 70. In the moving document reading operation, the scanning body 220 is stopped at a position below the document reading member 201a by the driver device 230, and reads an image of the document G conveyed by the document conveyor 202 and passing over the document reading member 201a. In the fixed document reading operation, the scanning body 220 is moved along the document platen 201b in the sub scanning direction Y and reads an image of the document G placed on the document platen 201b.

As illustrated in FIG. 3, the image reading device 200 includes an opening and closing sensor 203 (opening and closing sensing device), a motor drive circuit 204, an illumination control circuit 205, the close contact type image sensor 210, and a sub scanning sensing portion 240. The controller 70 is connected to the motor drive circuit 204, the illumination control circuit 205, the close contact type image sensor 210, and the sub scanning sensing portion 240, via the internal bus 75. The image reading device 200 includes the driver device 230 and a plurality of light sources 250. The image reading device 200 sequentially turns on the plurality of light sources 250 to read an image (color image) of the document G in the main scanning direction X by the close contact type image sensor 210.

The driver device 230 is used for moving the scanning body 220 in the sub scanning direction Y, and is connected to the motor drive circuit 204. The motor drive circuit 204 drives the driver device 230 by an instruction of the controller 70.

The plurality of light sources 250 irradiate the document G placed on the document platen 201b with light of different colors. In the present example, the plurality of light sources 250 include a red light source 251, a green light source 252, and a blue light source 253. The red light source 251 emits light having a peak wavelength in the red (R) region. The green light source 252 emits light having a peak wavelength in the green (G) region. The blue light source 253 emits light having a peak wavelength in the blue (B) region. The plurality of light sources 250 (251 to 253) are connected to the illumination control circuit 205. The illumination control circuit 205 controls turning on and turning off of the plurality of light sources 250 (251 to 253), by an instruction of the controller 70.

Figure 4:
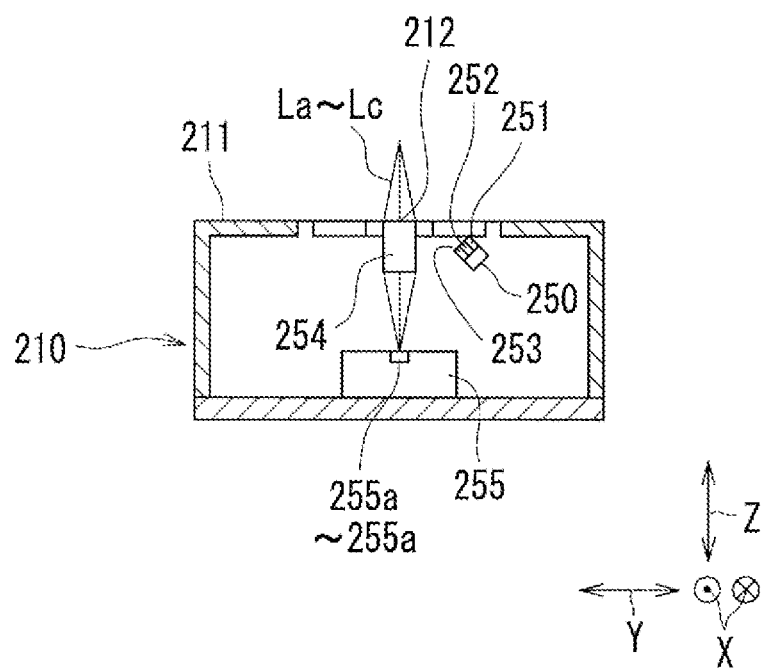
FIG. 4 is a schematic cross-sectional view of a close contact type image sensor illustrated in FIGS. 1 to 3.

FIG. 4 is a schematic cross-sectional view of the close contact type image sensor 210 illustrated in FIGS. 1 to 3. The close contact type image sensor 210 is a so-called contact image sensor (CIS), and has an elongated shape in the main scanning direction X.

The close contact type image sensor 210 senses light La to Lc of a plurality of different colors (red, blue, and green in the present example) reflected from the document G. Specifically, the close contact type image sensor 210 includes the plurality of light sources 250 (251 to 253), a condensing lens array 254, and a sensor portion 255. The condensing lens array 254 focuses, on the sensor portion 255, the light La to Lc of the plurality of different colors reflected from the document G. The sensor portion 255 photoelectrically converts the light La to Lc of the plurality of different colors received via the condensing lens array 254 to image data and outputs the image data. The sensor portion 255 includes a plurality of light receiving elements 255a to 255a arranged in the main scanning direction X, scans the document G in the main scanning direction X and individually reads the light La to Lc of the plurality of different colors reflected from the document G, by a reader 212 on an upper surface 211 of the close contact type image sensor 210. The sensor portion 255 scans and reads the light La to Lc of the plurality of different colors in the main scanning direction X by each of the plurality of light receiving elements 255a to 255a. The close contact type image sensor 210 senses, by an instruct of the controller 70, the luminance of the light La to Lc of the plurality of different colors imaged on the plurality of light receiving elements 255a to 255a, generates image data based on an image of the surface of the document G, and outputs the generated image data to the image signal processing circuit 74. In the present example, an output value output from the close contact type image sensor 210 when the red light source 251 is turned on is a red signal, an output value output from the close contact type image sensor 210 when the green light source 252 is turned on is a green signal, and further, an output value output from the close contact type image sensor 210 when the blue light source 253 is turned on is a blue signal.

As illustrated in FIG. 3, the sub scanning sensing portion 240 includes one or more sub scanning sensors. In the present example, the sub scanning sensing portion 240 includes a first sub scanning sensor 241 and a second sub scanning sensor 242. The first sub scanning sensor 241 is a sensor that senses a size of the document G in the sub scanning direction Y, and is a reflection type photosensor including a light emitter and a light receiver. The second sub scanning sensor 242 is also a sensor that senses the size of the document G in the sub scanning direction Y, and is a reflection type photosensor including a light emitter and a light receiver. The first sub scanning sensor 241 and the second sub scanning sensor 242 are provided on an inner bottom surface (a surface facing the document platen 201b) of the housing 201c enveloping the image reader 201 of the image reading device 200. In the present example, the first sub scanning sensor 241 and the second sub scanning sensor 242 are used for detecting an AB-series size and an inch-series size of the document G.

The controller 70 detects the size in the main scanning direction X of the document G placed on the document platen 201b, based on an output value output from the close contact type image sensor 210. The controller 70 detects the size of the document G in the sub scanning direction Y, based on an output value output from the sub scanning sensing portion 240 (in the present example, the first sub scanning sensor 241 or the second sub scanning sensor 242). A control process for detecting the size of the document G based on the output values from the close contact type image sensor 210 and the sub scanning sensing portion 240 will be described in detail later.

The image former 111 prints an image corresponding to the image data on the paper P, in accordance with an instruction from the controller 70. The operation processor 112 includes an input device such as a touch panel and an operation button, and a display device that displays display information, and supplies an operation signal (operation data) according to an operation by a user, to the controller 70.

Figure 5:
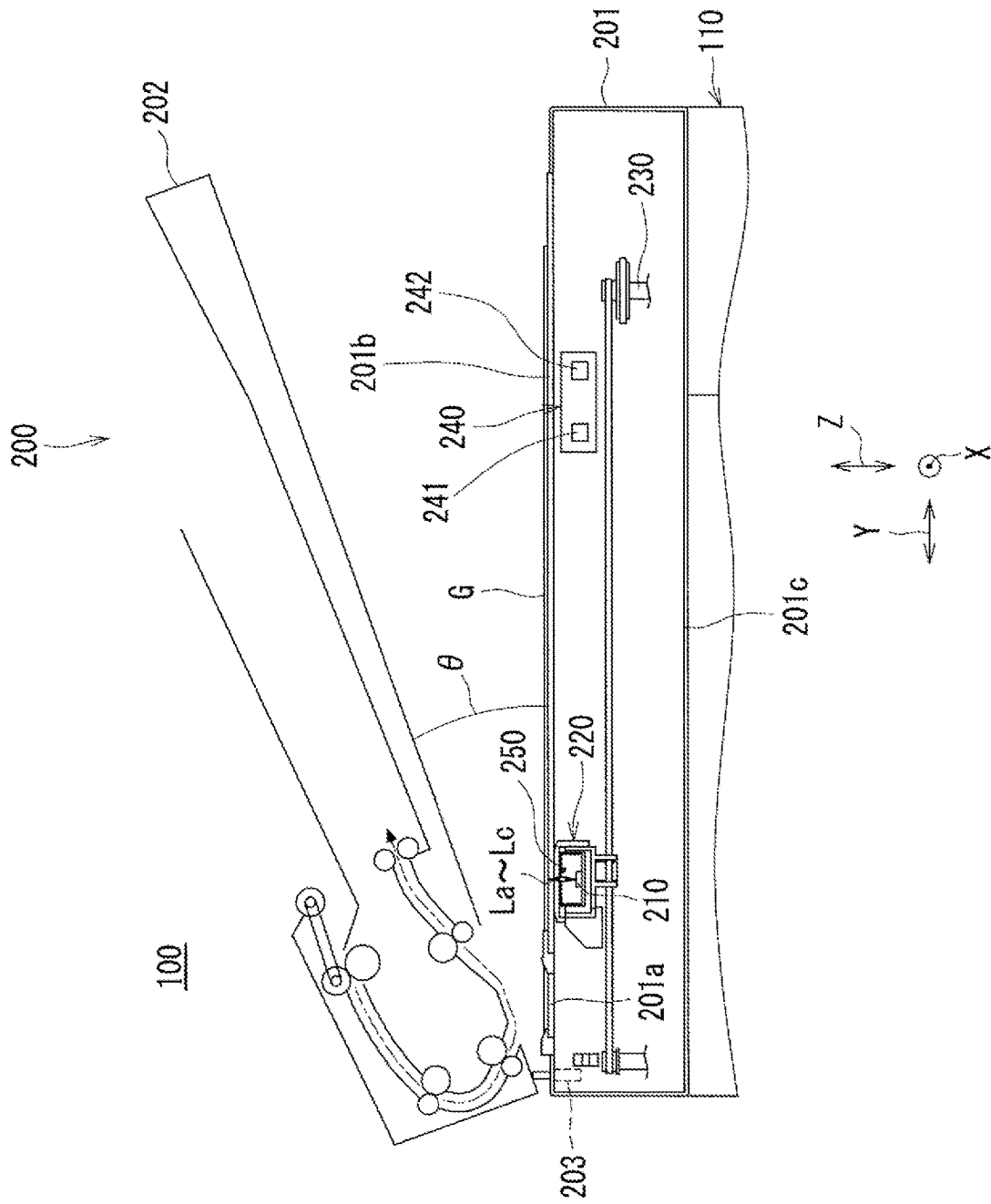
FIG. 5 is a front view illustrating a state where an opening and closing sensor is opened at a predetermined opening angle with respect to a document platen in the image reading device illustrated in FIG. 1.
Figure 6A:
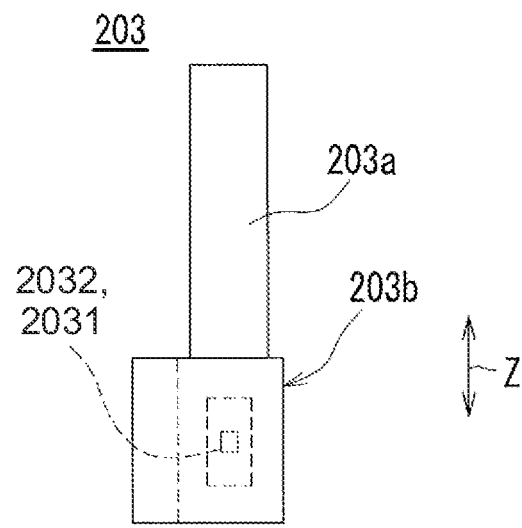
FIG. 6A is a schematic side view illustrating a sensing state of the opening and closing sensor when a document holder is opened at an opening angle or more with respect to the document platen.
Figure 6B:
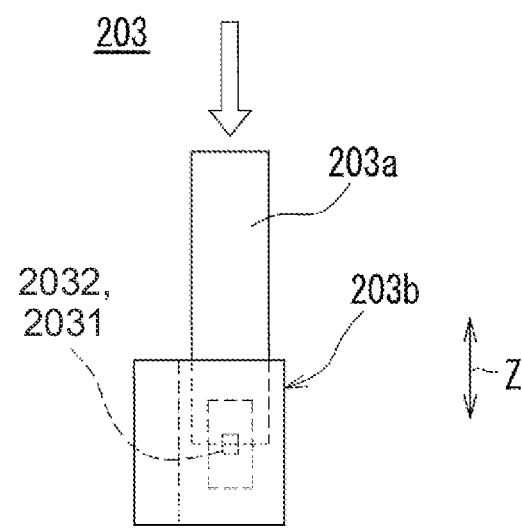
FIG. 6B is a schematic side view illustrating a sensing state of the opening and closing sensor when the opening angle of the document holder with respect to the document platen is sensed.
Figure 6C:
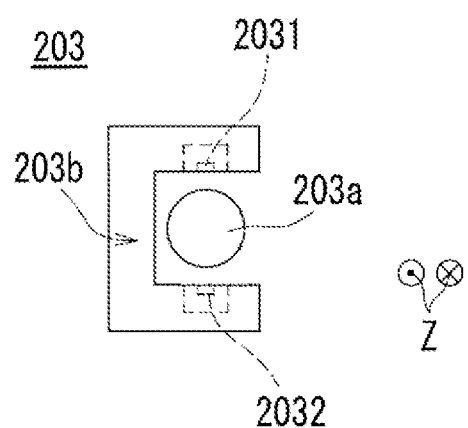
FIG. 6C is a schematic plan view of the opening and closing sensor as viewed from above.

FIG. 5 is a front view illustrating a state where the opening and closing sensor 203 is opened at a predetermined opening angle θ with respect to the document platen 201b in the image reading device 200 illustrated in FIG. 1. FIG. 6A is a schematic side view illustrating a sensing state of the opening and closing sensor 203 when a document holder (202) is opened at the opening angle θ or more with respect to the document platen 201b. FIG. 6B is a schematic side view illustrating a sensing state of the opening and closing sensor 203 when the opening angle θ of the document holder (202) with respect to the document platen 201b is sensed. FIG. 6C is a schematic plan view of the opening and closing sensor 203 as viewed from above.

The opening and closing sensor 203 senses opening operation and closing operation of the document holder (202) by sensing the predetermined opening angle θ (see FIG. 5) of the document holder (202). Specifically, the opening and closing sensor 203 senses an opening operation in which the document holder (202) is opened by a user from a state of being closed (closed state), and a closing operation in which the document holder (202) is closed from a state of being opened (opened state). That is, the opening and closing sensor 203 senses ON or OFF (ON in the present example) if the document holder (202) is positioned at an angle smaller than the predetermined opening angle θ with respect to the document platen 201b, and senses ON or OFF (OFF in the present example) if the document holder (202) is positioned at an angle equal to or larger than the predetermined opening angle θ with respect to the document platen 201b. Here, the predetermined opening angle θ may be an angle at which the close contact type image sensor 210 can sense external light, and may be 10 degrees or more and 80 degrees or less, for example, but the predetermined opening angle θ is not limited thereto. If the user performs an opening operation, the controller 70 can detect the opening operation, based on a sensing result of the opening operation by the opening and closing sensor 203 ("ON"->"OFF" in the present example). If the user performs a closing operation, the controller 70 can detect the closing operation, based on a sensing result of the closing operation by the opening and closing sensor 203 ("OFF"->"ON" in the present example).

As illustrated in FIGS. 6A to 6C, the opening and closing sensor 203 includes an actuator 203a and an optical sensor 203b. The actuator 203a is moved up and down, if the document holder (202) is opened and closed. As illustrated in FIG. 6C, the optical sensor 203b is formed in a U-shape that is rotated clockwise by 90 degrees (as viewed from above in a moving direction of the actuator 203a) in a plan view, and a light emitter 2031 is provided at one side, and a light receiver 2032 is provided on the other side of the two opposing sides of the optical sensor 203b.

If the document holder (202) is opened by a user (opened state), the actuator 203a is moved upward (see FIG. 6A), and the optical sensor 203b receives, by the light receiver 2032, light output from the light emitter 2031. On the other hand, if the document holder (202) is closed by the user (closed state), the actuator 203a is pushed downward by the document holder (202) (see FIG. 6B), and the light output from the light emitter 2031 of the optical sensor 203b is blocked by the actuator 203a and is not received by the light receiver 2032, or a received amount of light is reduced. If the controller 70 detects that a value of the light amount received by the light receiver 2032 changes from a value smaller than a predetermined threshold value to a value exceeding the threshold value, the controller 70 may determine that an operation on the document holder (202) by the user is an opening operation. If the controller 70 detects that the value of the light amount received by the light receiver 2032 changes from a value exceeding a predetermined threshold value to a value equal to or less than the threshold value, the controller 70 may determine that an operation on the document holder (202) by the user is a closing operation.

In the image forming apparatus 100 described above, for example, the user performs an opening operation on the document holder (202) in the closed state, places the document G on the document platen 201b, and the user performs a closing operation on the document holder (202) in the opened state, and gives a print instruction. At this time, if the controller 70 determines that the user performs the closing operation on the document holder (202), the controller 70 detects the size of the document G in the sub scanning direction Y, based on output values from the first sub scanning sensor 241 and the second sub scanning sensor 242, and detects the size of the document G in the main scanning direction X, based on an output value of the close contact type image sensor 210.

Specifically, in the detection of the size of the document G (document size) by the controller 70, first, if the opening and closing sensor 203 determines that the closing operation is performed, the controller 70 detects an approximate document size, based on output values from the first sub scanning sensor 241 and the second sub scanning sensor 242. If the opening and closing sensor 203 determines that the closing operation is performed, the controller 70 sequentially turns on the red light source 251, the green light source 252, and the blue light source 253 for each of a predetermined number of lines (for example, about 10 lines), while moving the scanning body 220 in the sub scanning direction Y. At this time, the controller 70 determines whether the document G is present (inside or outside a document area), from a difference of output values (an output balance degree being a degree of balance of the output values) of the close contact type image sensor 210 for each of a plurality of areas obtained by dividing (set in) an entire scanning area a of the close contact type image sensor 210. Here, if a difference between a maximum and a minimum of the output values of the close contact type image sensor 210 when the plurality of light sources 250 (251 to 253) are sequentially turned on is large, the difference (output balance degree) between the output values of the close contact type image sensor 210 is large (not balanced), and if the difference between the maximum and minimum of the output values is small, the difference (output balance degree) of the close contact type image sensor 210 is small (balanced). Subsequently, the controller 70 determines (detects) the size of the document G, based on a determination result of the size of the document G in the main scanning direction X obtained by the close contact type image sensor 210, and a detection result of the size of the document G in the sub scanning direction Y obtained by the first sub scanning sensor 241 and the second sub scanning sensor 242.

FIG. 7A is an illustrative view illustrating a plurality of areas into which the entire scanning area a of the close contact type image sensor 210 is divided if an AB-series document size is detected. In FIG. 7A, numerical values in parentheses represent a length (unit: mm) of the document G for each size of the document G.

As illustrated in FIG. 7A, in the detection of the AB-series document size, a plurality of areas for detecting the AB-series document size with respect to each of the light receiving elements 255a to 255a of the close contact type image sensor 210 (in the present example, an area 1, an area 2, an area 3, an area 4, an area 5, and an area 6) are set (stored) in advance in the non-volatile memory 72a of the storage 72. The areas 1 to 6 are set in order from a back side (far side) of the image reading device 200 (the image forming apparatus 100).

The areas 1 to 6 are set under the presumption that, if the document platen 201b is viewed from above (see FIG. 2), the document G is placed with a corner of the document G coinciding with a reference position being an upper left vertex of the document platen 201b.

The area 1 is set to detect the size of the document G in the main scanning direction X for A5R, B5R, and A4 documents. The area 2 is set to detect the size of the document G in the main scanning direction X for A5, A5R, and A4R documents. The area 3 is provided to detect the size of the document G in the main scanning direction X for B5 and B4 documents. The area 4 and the area 5 are provided to detect the size of the document G in the main scanning direction X for A4 and A3 documents. The area 6 is provided to detect the size of the document G in the main scanning direction X for documents outside the range of the AB-series document size.

In the example illustrated in FIG. 7A, the area 1 is set shorter than the width of an A5R document in the main scanning direction X, but the area 1 may be set to the width of an A5R document or the width of a B5R document. In the present example, in the image reading device 200, a sheet size may also be detected for the paper P being an 8K or a 16K document (sheet size employed in China). Therefore, the area 4 and the area 5 are provided, but if the AB-series document size is detected, the area 4 or the area 5 may be omitted, or the area 4 and the area 5 may be combined to one area.

FIG. 7B is a chart illustrating an example of a first determination table TA1 for determining the AB-series document size. The first determination table TA1 is set (stored) in advance in the non-volatile memory 72a of the storage 72.

In the first determination table TA1, numerical values written in a main scan field and a sub scan field corresponding to each size are the length (mm) of the sheet in each direction. In the first determination table TA1, "YES" indicates that the document G is present in the corresponding area, and "NO" indicate that the document G is not present in the corresponding area. In the first determination table TA1, a sub scan 1 indicates an output (ON or OFF) of the first sub scanning sensor 241 and a sub scan 2 indicates an output of the second sub scanning sensor 242. Therefore, the controller 70 may determine the size of the document G, based on whether the document G is present in each of the areas 1 to 6, the output of the first sub scanning sensor 241, and the output of the second sub scanning sensor 242. That is, the controller 70 detects the size (main scanning direction size) of the document G in the main scanning direction X, based on whether the document G is present in each of the areas 1 to 6. The controller 70 detects the size (sub scanning direction size) of the document G in the sub scanning direction Y from the output of the first sub scanning sensor 241 and the output of the second sub scanning sensor 242. The controller 70 performs a document size determination process in which the controller 70 determines, as the size of the document G, a size corresponding to a detected main scanning direction size and a detected sub scanning direction size.

For example, according to the first determination table TA1 illustrated in FIG. 7B, if the document G is present in the areas 1 to 3, the document G is not present in the areas 4 to 6, and the output of the first sub scanning sensor 241 and the output of the second sub scanning sensor 242 are both ON, the controller 70 determines that the document size is the B4 size.

First Embodiment

In the image reading device 200 according to the present embodiment, the controller 70 performs an area determination process in which, in a state where the document holder (202) is opened, the controller 70 determines, in the entire scanning area a of the close contact type image sensor 210, a first scanning area in which a difference between output values of the close contact type image sensor 210 when the plurality of light sources 250 (251 to 253) are sequentially turned on (output balance degree) is within a predetermined threshold value range, and a second scanning area in which the difference between the output values of the close contact type image sensor 210 (output balance degree) is outside the predetermined threshold value range.

According to the findings of the inventors, it is discovered that, in a state where the document holder (202) is opened, the difference between the output values (output balance degree) of the close contact type image sensor 210 when the light La to Lc of the plurality of different colors is sensed from a document area being an area of the document G placed on the document platen 201b, is larger than the difference between the output values (output balance degree) of the close contact type image sensor 210 outside the document area (not balanced). The inventors found that it is possible to accurately detect the size of the document G in the main scanning direction X by detecting a variation of these differences between the output values (output balance degree).

In the present example, it is assumed that the output values of the close contact type image sensor 210 include 256 values, from 0 to 255. Here, it is assumed that, among the 256 output values of the close contact type image sensor 210, "black" is obtained for an output value of red light (R): 0, an output value of green light (G): 0, and an output value of blue light (B): 0, and "white" is obtained for an output value of red light: 255, an output value of green light: 255, and an output value of blue light: 255.

In this case, for example, assuming that the threshold value range is T and the maximum output value of the close contact type image sensor 210 is Imax (255 in the present example), in the area determination process, the first scanning area may be an area where T1≤Expression (1)≤T2, and the second scanning area may be an area where T2≤Expression (1)≤T3.

For example, Expression (1) may be defined as the following expression. $\{Imax-[Max(R,G,B)-Min(R,G,B)]/Imax\}*100[\%]$  Expression (1)

Here, Max(R, G, B) is an operator that extracts the largest value among R, G, and B, and Min(R, G, B) is an operator that extracts the smallest value among R, G, and B. Expression (1) and values of Imax, T1, T2, and T3 are stored (set) in advance in the non-volatile memory 72a of the storage 72.

Examples of T1, T2, and T3 include 0%, 90%, and 100%, respectively, but are not limited thereto. In the area determination process, the controller 70 calculates $\{Imax-[Max(R, G, B)-Min(R, G, B)]/Imax\}*100[\%]$ of Expression (1) for each of the light receiving elements 255a to 255a of the close contact type image sensor 210. Specifically, in a case where Imax is 255 and T1, T2, and T3 are 0%, 90%, and 100%, respectively, if R is 184, G is 197, and B is 55 in one light receiving elements 255a of the light receiving elements 255a to 255a of the close contact type image sensor 210, $\{255-(197-55)\}/255*100=44.3\%$ is obtained. Thus, the controller 70 can recognize, from 0%<Expression (1) 90%, that the one light receiving element 255a is in the first scanning area. If R is 249, G is 253, and B is 243 in another one of the light receiving elements 255a to 255a of the close contact type image sensor 210, $\{255-(253-243)/255\}/255*100=96.1\%$ is obtained. Thus, the controller 70 can recognize, from 90%<Expression (1) 100%, that the other light receiving element 255a is in the second scanning area.

Expression (1) is not limited to the above-mentioned expression, and may be a variance or a standard deviation expression. In such a case, if the value of Expression (1) is small (close to 0), the difference between the output values (output balance degree) of the close contact type image sensor 210 is small (balanced), and if the value of Expression (1) is large, the difference between the output values (output balance degree) of the close contact type image sensor 210 is large (not balanced).

Subsequently, the controller 70 detects the size of the document G in the main scanning direction X, based on a position of a boundary in the main scanning direction X between the first scanning area and the second scanning area determined in the area determination process. For example, if the controller 70 detects that the position of the boundary between the first scanning area and the second scanning area in the main scanning direction X is between the area 2 and the area 3, the controller 70 may determine that the document G is present in the area 1 and the area 2 and the document G is not present in the areas 3 to 6.

As described above, in the image reading device 200 according to the present embodiment, as the area determination process, in a state where the document holder (202) is opened, first, the controller 70 determines, in the entire scanning area a of the close contact type image sensor 210, the first scanning area in which a difference between output values of the close contact type image sensor 210 when the plurality of light sources 250 (251 to 253) are sequentially turned on (output balance degree) is within a predetermined threshold value range, and the second scanning area in which the difference between the output values of the close contact type image sensor 210 (output balance degree) is outside the predetermined threshold value range. Next, the controller 70 detects the size of the document G in the main scanning direction X, based on the position of the boundary in the main scanning direction X between the first scanning area and the second scanning area determined in the area determination process. That is, it is possible to detect difference between the difference of the output values (output balance degree) of the close contact type image sensor 210 when the light La to Lc of the plurality of different colors is sensed from a document area being an area of the document G placed on the document platen 201b, and the difference of the output values (output balance degree) of the close contact type image sensor 210 outside the document area. Therefore, it is possible to detect the size of the document G in the main scanning direction X with high accuracy.

Although the controller 70 may perform the area determination process at a time of detecting placement of the document G on the document platen 201b, in this case, it cannot be ensured that the area determination process is performed in a state where the document holder (202) is opened.

The image reading device 200 according to the present embodiment includes the opening and closing sensor 203 that senses the opening operation and closing operation of the document holder (202). If the opening and closing sensor 203 senses the opening operation or closing operation of the document holder (202) (in the present example, during the closing operation), the controller 70 performs the area determination process.

Thus, it is possible to ensure that the area determination process is performed in the state where the document holder (202) is opened.

Specifically, if the opening and closing sensor 203 senses the opening angle θ of the document holder (202) (in the present example, during the closing operation), the controller 70 performs the area determination process.

Incidentally, during normal document reading, there is no or almost no difference between the amounts of light of the plurality of light sources 250 (251 to 253). On the other hand, for an area determination, from the viewpoint of improving the determination accuracy by making the output values of the close contact type image sensor 210 when the light La to Lc of the plurality of different colors is sensed from the document area different from each other, it is desirable that the variation in the amount of light of the plurality of light sources 250 (251 to 253) is large.

Therefore, in the present embodiment, the controller 70 uses, in the area determination process, amounts of light of the plurality of light sources 250 (251 to 253) different from those used in the normal document reading.

Thus, it is possible to increase the difference between the amounts of light of the plurality of light sources 250 (251 to 253) during the area determination process, compared to when normal document reading is performed. Therefore, during the area determination, it is possible to increase the difference between the output values (output balance degree) of the close contact type image sensor 210 when the light La to Lc of the plurality of different colors is sensed from the document area, to make the output values different from each other, and thus improve the determination accuracy.

Incidentally, if, even in the document area, the difference between the output values (output balance degree) of the close contact type image sensor 210 when the light La to Lc of the plurality of different colors is sensed from the document area is small, an erroneous determination may occur when the light La to Lc of the plurality of different colors is sensed from the document area, and in this case, it is not possible to reliably detect the size of the document G in the main scanning direction X.

Figure 8A:
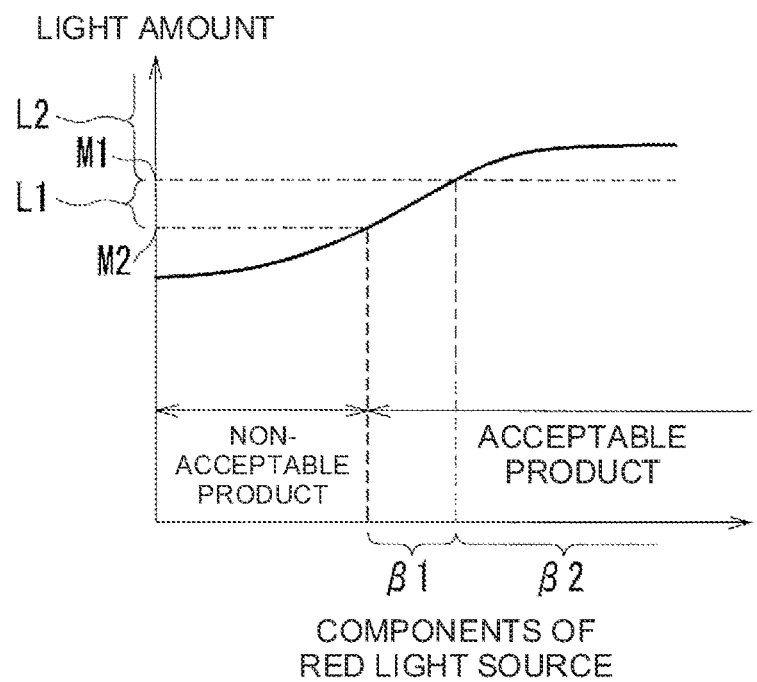
FIG. 8A is a graph showing results of arranging, in ascending order, light amounts for components of a red light source to which the same current value is input when the red light source is manufactured on a production line.
Figure 8B:
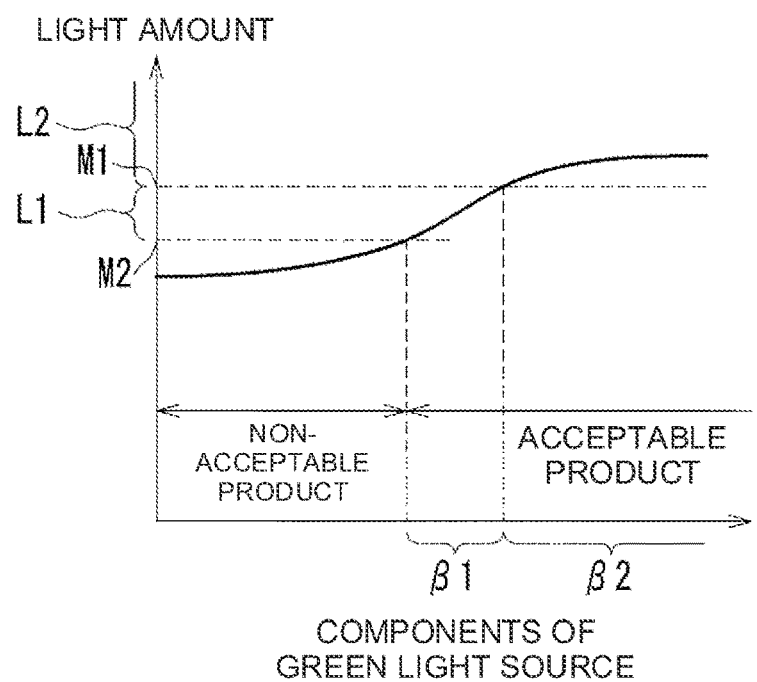
FIG. 8B is a graph showing results of arranging, in ascending order, light amounts for components of a green light source to which the same current value is input when the green light source is manufactured on a production line.
Figure 8C:
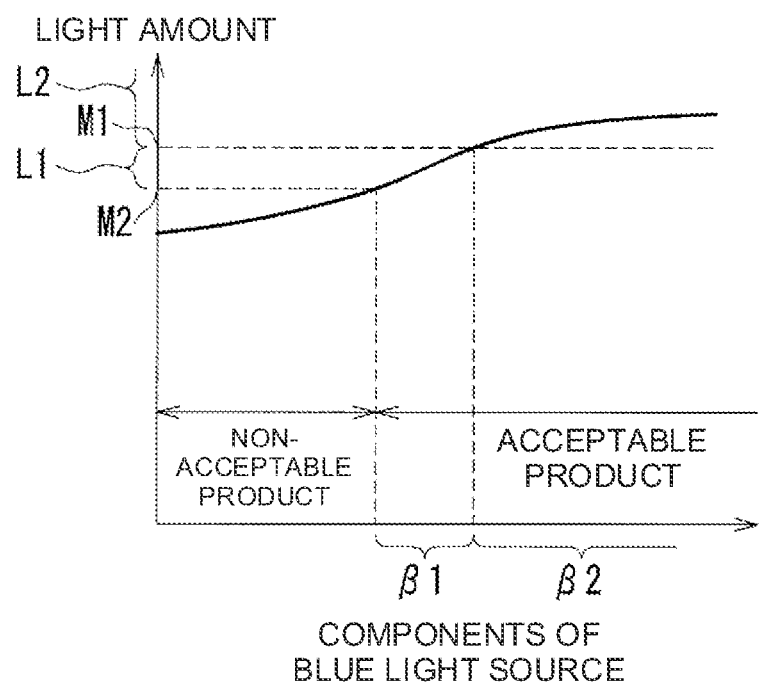
FIG. 8C is a graph showing results of arranging, in ascending order, light amounts for components of a blue light source to which the same current value is input when the blue light source is manufactured on a production line.

Therefore, the image reading device 200 according to the present embodiment has the following configuration. FIGS. 8A to 8C are graphs showing results of arranging, in ascending order, light amounts for components of the plurality of light sources 250 (the red light source 251, the green light source 252, and the blue light source 253) into which the same current value is input when the plurality of light sources 250 (251 to 253) are manufactured on a production line.

As shown in FIGS. 8A to 8C, the plurality of light sources 250 (251 to 253) are light sources of which light amounts at the same current value are within a first light amount variation range (31. The first light amount variation range 131 is a range corresponding to a first reference light amount range L1 between a predetermined first reference light amount M1 and a predetermined second reference light amount M2 smaller than the first reference light amount M1. Here, a component of the light source 250 having a light amount smaller than the second reference light amount M2 is a non-acceptable product. The controller 70 turns on the plurality of light sources 250 (251 to 253) in the first light amount variation range r31 with the same current value.

Therefore, it is possible to increase the difference between the amounts of light of the plurality of light sources 250 (251 to 253). Thus, the difference between the output values (output balance degree) of the close contact type image sensor 210 when the light La to Lc of the plurality of different colors is sensed from the document area can be increased to make the output values different from each other. Therefore, it is possible to reliably differentiate the difference between the output values (output balance degree) of the close contact type image sensor 210 when the light La to Lc of the plurality of different colors is sensed from the document area, from the difference between the output values (output balance degree) of the close contact type image sensor 210 when the light La to Lc of the plurality of different colors is sensed from outside the document area.

Second Embodiment

In the present embodiment, the plurality of light sources 250 (251 to 253) are light sources of which light amounts at the same current value are within a second light amount variation range 132. The second light amount variation range 132 is a range corresponding to a second reference light amount range L2 larger than the predetermined first reference light amount M1. The controller 70 turns on the plurality of light sources 250 (251 to 253) in the second light amount variation range 132 with different current values.

Therefore, it is possible to increase the difference between the amounts of light of the plurality of light sources 250 (251 to 253). Thus, the difference between the output values (output balance degree) of the close contact type image sensor 210 when the light La to Lc of the plurality of different colors is sensed from the document area can be increased to make the output values different from each other. Therefore, it is possible to reliably differentiate the difference between the output values (output balance degree) of the close contact type image sensor 210 when the light La to Lc of the plurality of different colors is sensed from the document area, from the difference between the output values (output balance degree) of the close contact type image sensor 210 when the light La to Lc of the plurality of different colors is sensed from outside the document area.

Third Embodiment

Depending on the image of the document G, the difference between the output values (output balance degree) of the close contact type image sensor 210 when the light La to Lc of the plurality of different colors is sensed from the document area may be small, and in such a case, the detection accuracy of the size of the document G in the main scanning direction X deteriorates.

Thus, in the present embodiment, the controller 70 causes the close contact type image sensor 210 to perform scanning in the main scanning direction X a plurality of times, and changes the current value supplied to the plurality of light sources 250 (251 to 253) each time the scanning in the main scanning direction X is performed.

Thus, regardless of the image of the document G, it is possible to reduce the possibility that the difference between the output values (output balance degree) of the close contact type image sensor 210 when the light La to Lc of the plurality of different colors is sensed from the document area is small, and thus, the detection accuracy of the size of the document G in the main scanning direction X can be improved.

Control Example of Document Size Determination Process

Next, Control Examples 1 to 3 of the document size determination process in which the controller 70 determines the size of the document G, will be described below.

Control Example 1 of Document Size Determination Process

Figure 9A:
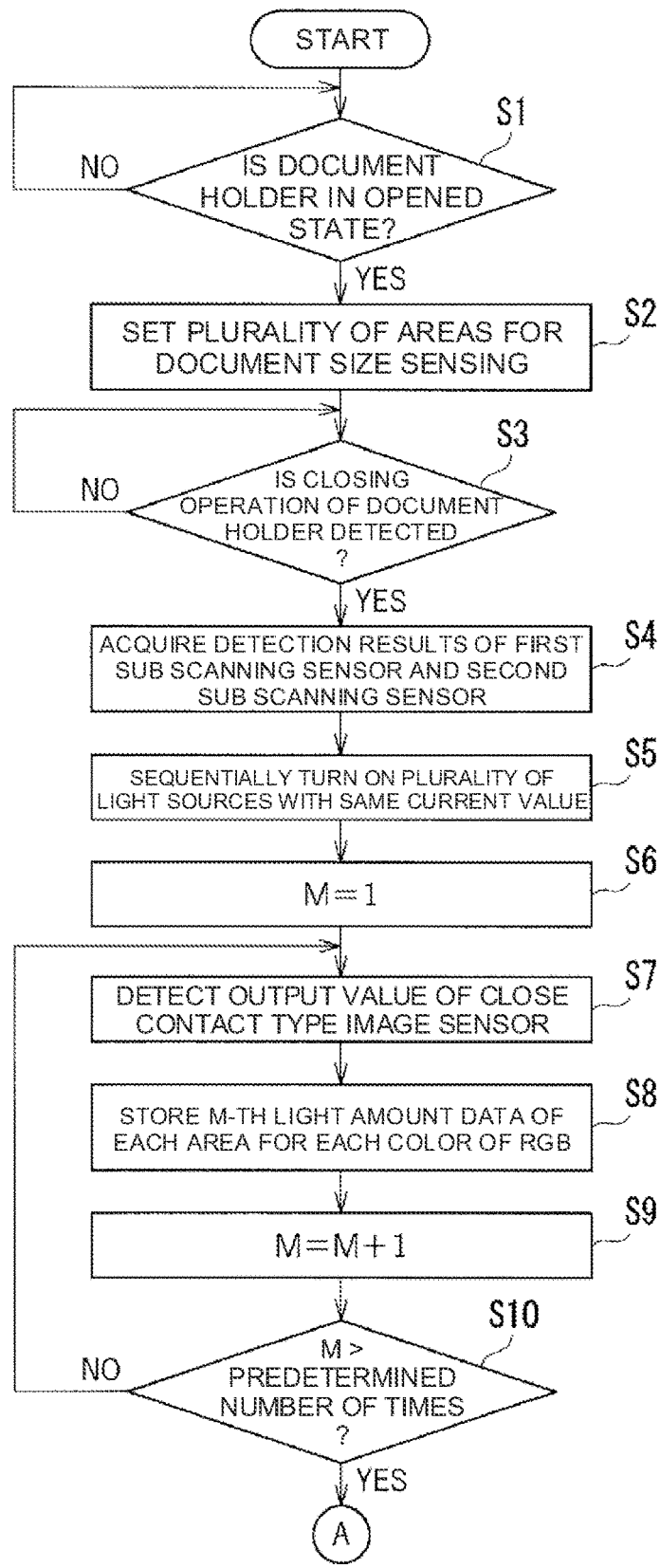
FIG. 9A is a flowchart illustrating a former half of Control Example 1 of a document size determination process by a controller.
Figure 9B:
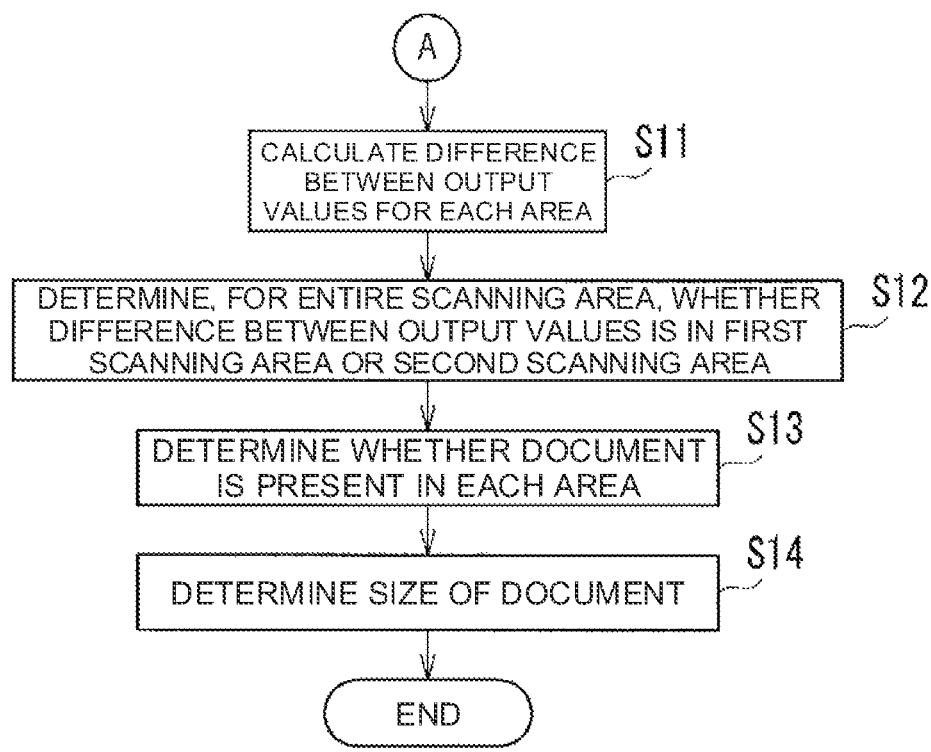
FIG. 9B is a flowchart illustrating a latter half of Control Example 1 of the document size determination process by the controller.

FIGS. 9A and 9B are flowcharts illustrating Control Example 1 of the document size determination process by the controller 70. Control Example 1 of the document size determination process corresponds to the first embodiment described above. That is, the plurality of light sources 251 to 253 are light sources within the first light amount variation range 131 corresponding to the first reference light amount range L1, and the plurality of light sources 251 to 253 within the first light amount variation range 131 are turned on with the same current value.

As illustrated in FIG. 9A, in the document size determination process, the controller 70 first determines whether the document holder (202) is in the opened state (step S1). In the present example, the controller 70 detects an output of the opening and closing sensor 203, and determines whether the light emitted from the light emitter 2031 of the optical sensor 203b is received by the light receiver 2032 without being blocked by the actuator 203a. The controller 70 waits until the document holder (202) is opened (step S1: NO). If the controller 70 determines that the document holder (202) is in the opened state (step S1), the controller 70 reads, from the first determination table TA1 illustrated in FIG. 7B, the plurality of areas 1 to 6 for detecting the document size and sets the areas 1 to 6 (step S2).

Next, the controller 70 determines whether the closing operation of the document holder (202) is detected (step S3). The controller 70 waits until the closing operation of the document holder (202) is detected (step S3: NO). If the controller 70 determines that the document holder (202) is in the closed state (step S3: YES), the controller 70 acquires detection results (ON or OFF) of the first sub scanning sensor 241 and the second sub scanning sensor 242 (step S4). In the present example, the controller 70 stores sub scanning data representing the detection results of the first sub scanning sensor 241 and the second sub scanning sensor 242, in the volatile memory 72b.

Next, the controller 70 sequentially turns on the plurality of light sources 251 to 253 with the same current value for each line (step S5). Here, the order in which the plurality of light sources 251 to 253 are turned on is not particularly limited.

Next, the controller 70 sets a variable M to an initial value (M=1). Here, the variable M is a count value for counting the number of times the scanning (the scan) is performed in the main scanning direction X.

Next, the controller 70 detects an output value of the close contact type image sensor 210 (step S7), and stores M-th light amount data of each area (in the present example, the areas 1 to 6), in the volatile memory 72b for each color of RGB (step S8).

Subsequently, the controller 70 adds 1 to the variable M (M=M+1) (step S9), and determines whether the variable M exceeds a predetermined number of times (5 times in the present example) (step S10). If the controller 70 determines that the variable M is equal to or less than the predetermined number of times (5 times in the present example) (step S10: NO), the processing proceeds to step S7. On the other hand, if the controller 70 determines that the variable M exceeds the predetermined number of times (5 times in the present example) (step S10: YES), the processing proceeds to step S11 illustrated in FIG. 9B. In the present example, scan times of steps S7 to S10 are set to a predetermined time (500 msec: 100 msec per scan).

As illustrated in FIG. 9B, the controller 70 calculates a difference between the output values (output balance degree) for each of the areas 1 to 6, according to Expression (1) (step S11). In the present example, the controller 70 stores the difference between the output values (output balance degree) calculated for each of the areas 1 to 6, in the volatile memory 72b.

Next, the controller 70 determines, for the entire scanning area a, whether the difference between the output values (output balance degree) is in the first scanning area or the second scanning area (step S12) (area determination process). In the present example, the controller 70 stores detected one of the first scanning area and the second scanning area, in the volatile memory 72b for each of the areas 1 to 6.

Next, the controller 70 determines whether the document G is present in each of the areas 1 to 6 (step S13). That is, the controller 70 detects the size of the document G in the main scanning direction X, from the position of the boundary in the main scanning direction X between the first scanning area and the second scanning area determined in the area determination process of step S12 in the areas 1 to 6 illustrated in FIG. 7A.

Next, the controller 70 determines the size of the document G (step S14), and ends the document size determination process. In the present example, the controller 70 determines the size of the document G according to the first determination table TA1 illustrated in FIG. 7B, from the output of the first sub scanning sensor 241, the output of the second sub scanning sensor 242, and presence or absence of the document G in each of the areas 1 to 6 in the main scanning direction X determined by the close contact type image sensor 210. Once the controller 70 determines the size of the document G, the controller 70 stores information about the determined size of the document G in the volatile memory 72b and uses the stored information in a subsequent printing process or the like.

Control Example 2 of Document Size Determination Process

Figure 10A:
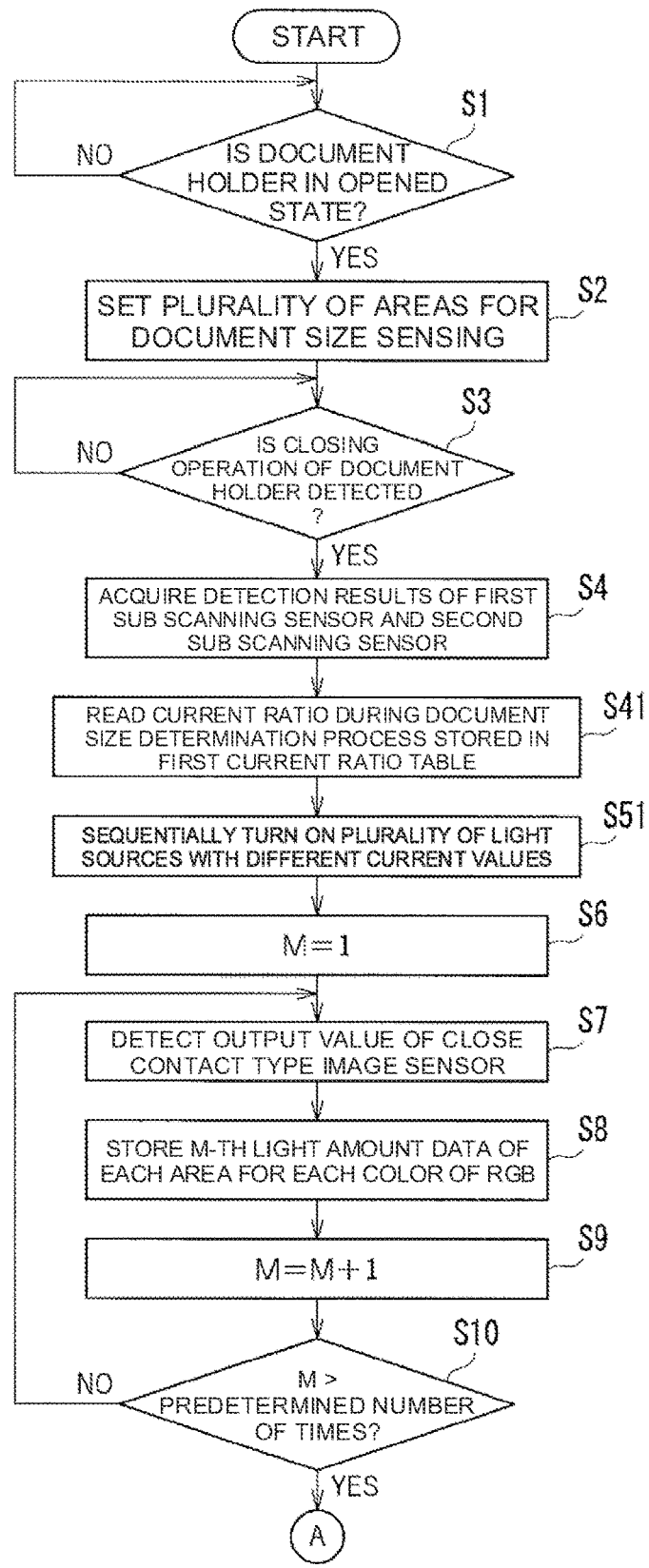
FIG. 10A is a flowchart illustrating a former half of Control Example 2 of a document size determination process by the controller.
Figures 10B, 10C:
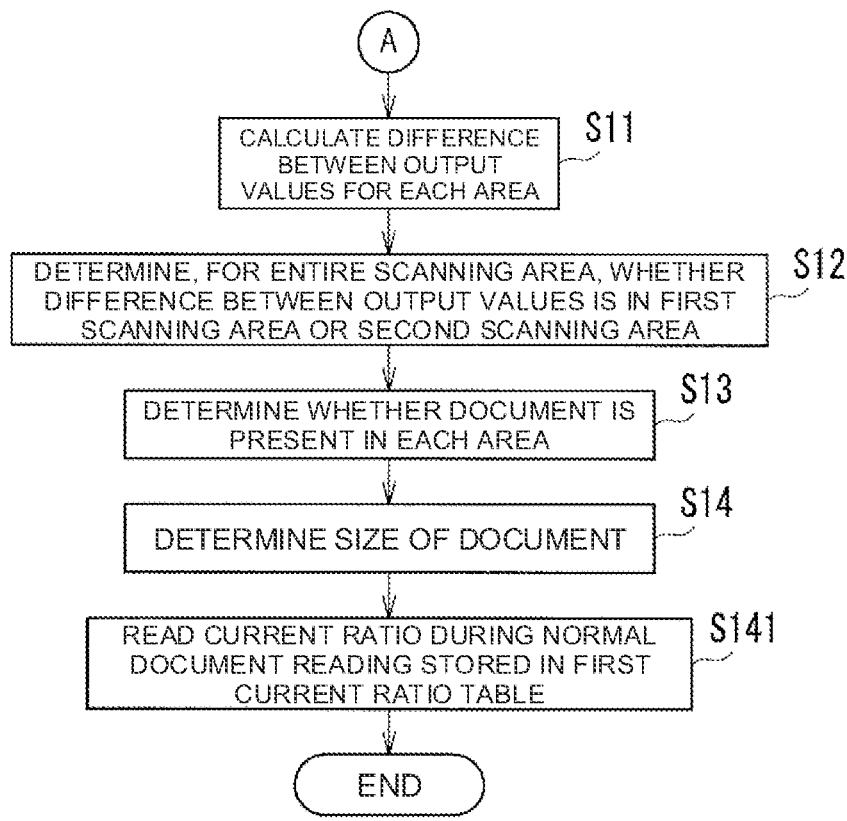
FIG. 10B is a flowchart illustrating a latter half of Control Example 2 of the document size determination process by the controller.
FIG. 10C is a chart illustrating a first current ratio table in which current ratios of a plurality of light sources are stored.

FIGS. 10A and 10B are flowcharts illustrating Control Example 2 of the document size determination process by the controller 70. FIG. 10C is a chart illustrating a first current ratio table TB1 in which current ratios R1, R2, and R3 of each of the plurality of light sources 251 to 253 are stored. The first current ratio table TB1 is stored (set) in advance in the non-volatile memory 72a of the storage 72. Control Example 2 of the document size determination process corresponds to the second embodiment described above. That is, the plurality of light sources 251 to 253 are light sources within the second light amount variation range 132 corresponding to the second reference light amount range L2, and the plurality of light sources 251 to 253 within the second light amount variation range 132 are turned on different current values.

Control Example 2 illustrated in FIGS. 10A and 10B is much the same as Control Example 1 illustrated in FIGS. 9A and 9B, except that, in Control Example 1 illustrated in FIGS. 9A and 9B, step S41 is provided between step S4 and step S5 illustrated in FIG. 9A and step S141 is provided after step S14 illustrated in FIG. 9B. Below, differences from Control Example 1 of the document size determination process will be mainly described.

As illustrated in FIG. 10C, the current ratios R1, R2, and R3 of the plurality of light sources 251 to 253 are stored (set) in advance in the first current ratio table TB1 of the non-volatile memory 72a.

The current ratios R1, R2, and R3 during normal document reading are all 100%, but the current ratios R1, R2, and R3 during the area determination process are values different from each other. In the present example, it is assumed that R1=0% for the red light source 251, R2=50% for the green light source 252, and R3=100% for the blue light source 253.

In step S41 illustrated in FIG. 10A, the controller 70 reads the current ratios R1, R2, and R3 during the document size determination process, stored in the first current ratio table TB1.

In step S51 illustrated in FIG. 10A, the controller 70 inputs different current values to the plurality of light sources 251 to 253 to sequentially turn on the plurality of light sources 251 to 253 with different current values. Here, the current values different from each other are values obtained by multiplying a reference current value (for example, a rated current value (a maximum current value by design)) with each of the current ratios R1, R2, and R3 during the document size determination process (in the present example, 0%, 50%, and 100%) read from the first current ratio table TB1.

In step S141 illustrated in FIG. 10B, the controller 70 reads the current ratios R1, R2, and R3 (100%, 100%, and 100%) during normal document reading, stored in the first current ratio table TB1. During normal document reading, the controller 70 inputs the same current value to each of the plurality of light sources 251 to 253, to sequentially turn on the plurality of light sources 251 to 253 with the same current value. Here, the same current value is the reference current value.

Control Example 3 of Document Size Determination Process

Figure 11A:
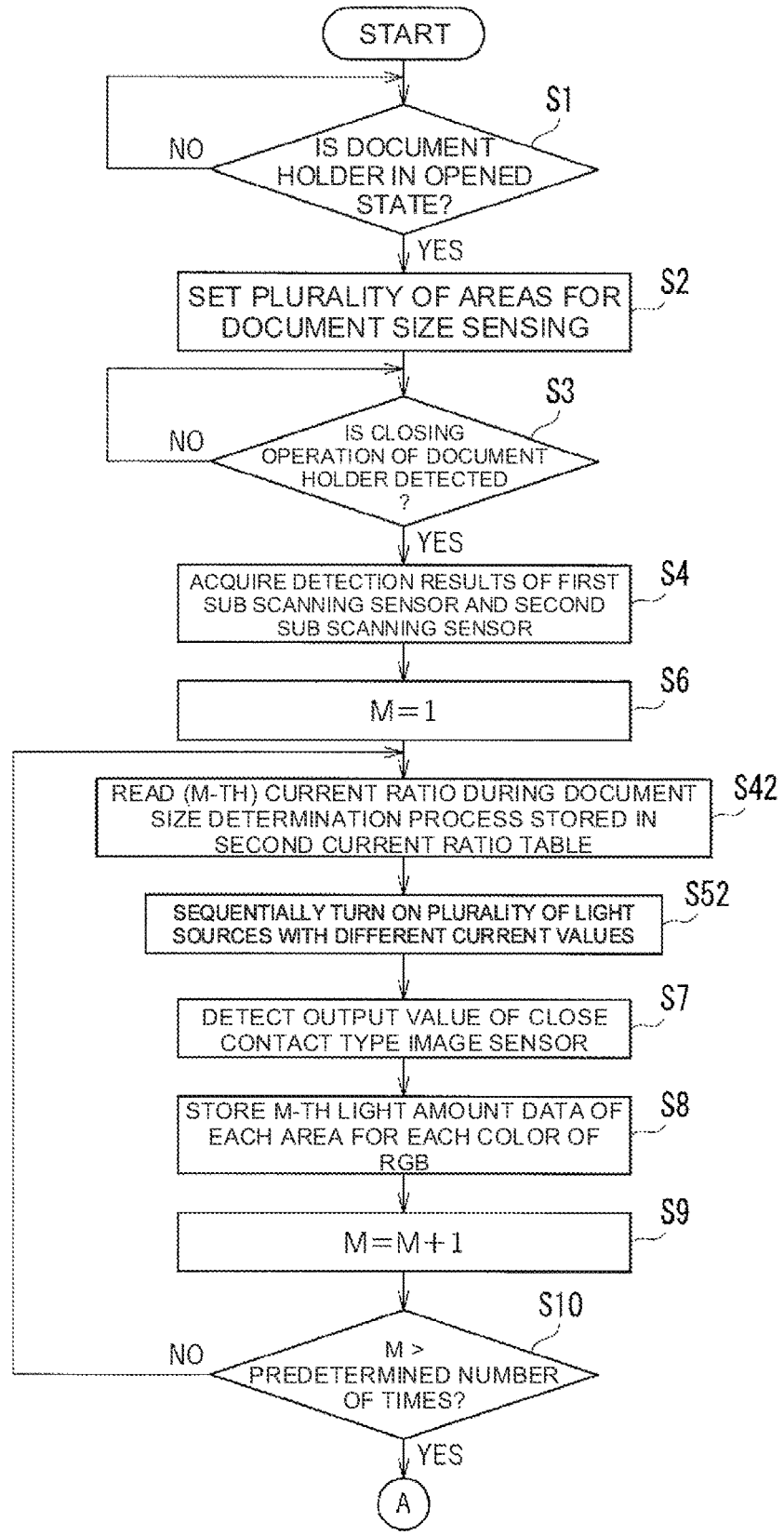
FIG. 11A is a flowchart illustrating a former half of Control Example 3 of a document size determination process by the controller.

FIGS. 11A and 11B are flowcharts illustrating Control Example 3 of the document size determination process by the controller 70. FIG. 11C is a chart illustrating a second current ratio table TB2 in which the current ratios R1, R2, and R3 of each of the plurality of light sources 251 to 253 are stored. The second current ratio table TB2 is stored (set) in advance in the non-volatile memory 72a of the storage 72. Control Example 3 of the document size determination process corresponds to the third embodiment described above. That is, the controller 70 causes the close contact type image sensor 210 to perform scanning in the main scanning direction X a plurality of times, and changes the current value supplied to the plurality of light sources 250 (251 to 253) each time the scanning in the main scanning direction X is performed.

Control Example 3 illustrated in FIGS. 11A and 11B is much the same as Control Example 2 illustrated in FIGS. 10A and 10B, except that, in Control Example 2 illustrated in FIGS. 10A and 10B, each of step S42 and step S52 are provided instead of step S41 and step S51 illustrated in FIG. 10A, step S42 and step S52 are performed before step S7 and after the arrow from step S10: NO, and step S142 is provided instead of step S141 illustrated in FIG. 10B. Below, differences different from Control Example 2 of the document size determination process will be mainly described.

As illustrated in FIG. 11C, the current ratios R1, R2, and R3 of the plurality of light sources 251 to 253 for each scanning are stored (set) in advance in the second current ratio table TB2 of the non-volatile memory 72a.

The current ratios R1, R2, and R3 during normal document reading are all 100%, but the current ratios R1, R2, and R3 during the area determination process are values different from each other each time the scanning in the main scanning direction X is performed. In the present example, for the first scanning, it is assumed that R1=0% for the red light source 251, R2=50% for the green light source 252, and R3=100% for the blue light source 253. For the second scanning, it is assumed that R1=100% for the red light source 251, R2=50% for the green light source 252, and R3=0% for the blue light source 253. For the third scanning, it is assumed that R1=50% for the red light source 251, R2=0% for the green light source 252, and R3=100% for the blue light source 253. For the fourth scanning, it is assumed that R1=0% for the red light source 251, R2=100% for the green light source 252, and R3=50% for the blue light source 253. For the fifth scanning, it is assumed that R1=100% for the red light source 251, R2=0% for the green light source 252, and R3=50% for the blue light source 253.

In step S42 illustrated in FIG. 11A, the controller 70 reads the (M-th) current ratios R1, R2, and R3 during the document size determination process, stored in the second current ratio table TB2.

In step S52 illustrated in FIG. 11A, the controller 70 inputs different current values to the plurality of light sources 251 to 253 to sequentially turn on the plurality of light sources 251 to 253 with different current values. Here, the current values different from each other are values obtained by multiplying a reference current value (for example, a rated current value (a maximum current value by design)) with each of the (M-th) current ratios R1, R2, and R3 during the document size determination process read from the second current ratio table TB2 (in the present example, 0%, 50%, and 100% for the first scanning, 100%, 50%, and 0% for the second scanning, 50%, 0%, and 100% for the third scanning, 0%, 100%, and 50% for the fourth scanning, and 100%, 0%, and 50% for the fifth scanning).

In step S142 illustrated in FIG. 11B, the controller 70 reads the current ratios R1, R2, and R3 (100%, 100%, and 100%) during normal document reading stored in the second current ratio table TB2.

Other Embodiments

The image reading device 200 according to the present embodiment is the same as in the first to third embodiments, except that an inch-series document size is determined instead of the AB-series document size. Below, differences different from the first to third embodiments will be mainly described.

Figure 12A:
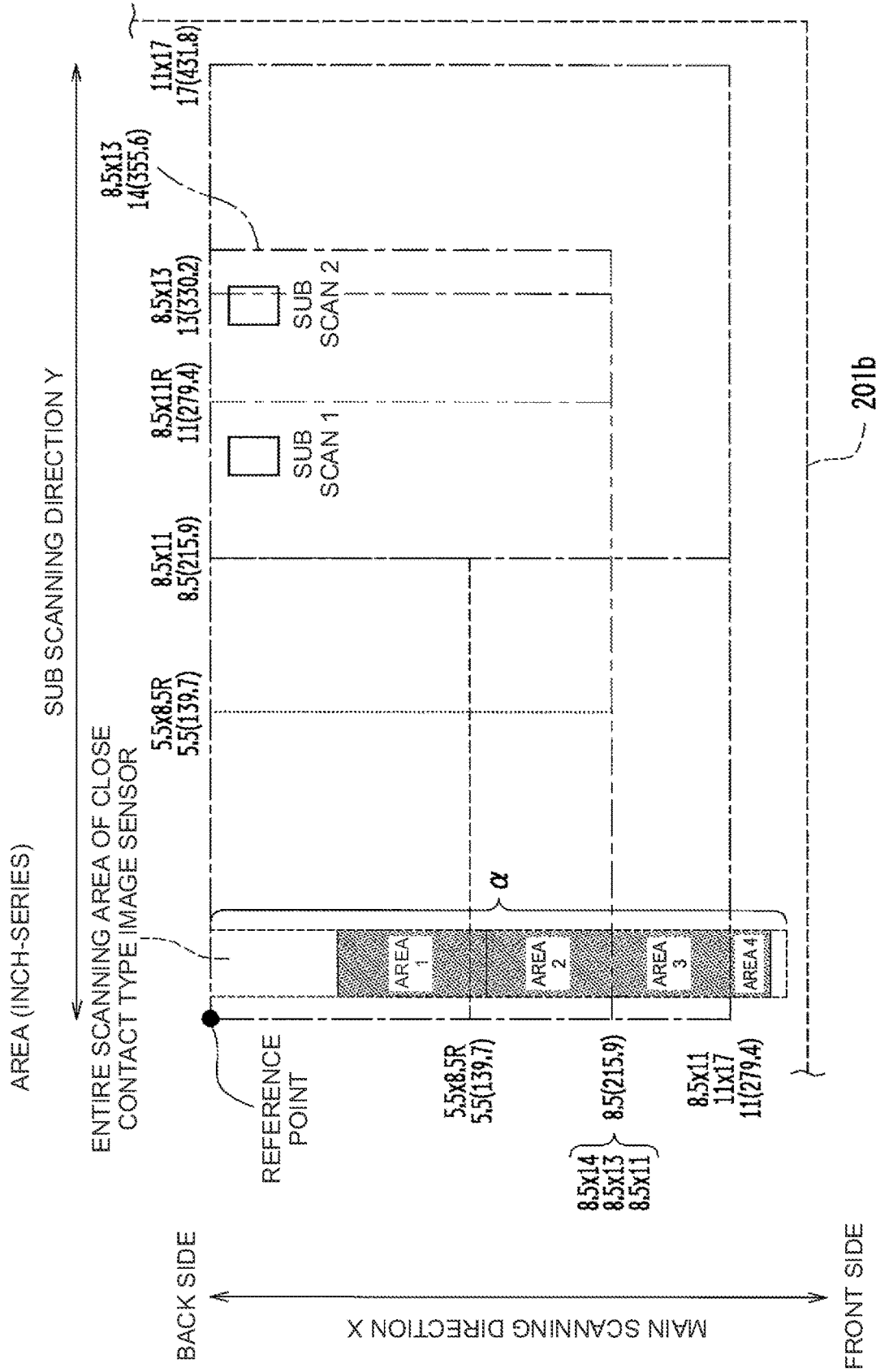
FIG. 12A is an illustrative view illustrating a plurality of areas into which an entire scanning area of the close contact type image sensor is divided if an inch-series document size is determined.

FIG. 12A is an illustrative view illustrating a plurality of areas into which the entire scanning area a of the close contact type image sensor 210 is divided if an inch-series document size is determined. In FIG. 12A, numerical values in parentheses represent a length (unit: mm) of the document G for each size of the document G.

As illustrated in FIG. 12A, in the determination of the inch-series document size, a plurality of areas for detecting the inch-series document size for each of the light receiving elements 255a to 255a of the close contact type image sensor 210 (in the present example, an area 1, an area 2, an area 3, and an area 4) are set (stored) in advance in the non-volatile memory 72a of the storage 72. Similarly to the case of determining the AB-series document size, the areas 1 to 4 are set in order from the back side (far side) of the image reading device 200 (the image forming apparatus 100).

FIG. 12B is a chart illustrating an example of a second determination table TA2 for determining the inch-series document size. The second determination table TA2 is set (stored) in advance in the non-volatile memory 72a of the storage 72.

Also in the second determination table TA2, similarly to the first embodiment, numerical values written in a main scan field and a sub scan field corresponding to each size are the length (mm) of the sheet in each direction. In the second determination table TA2, "YES" indicates that the document G is present in the corresponding area, and "NO" indicate that the document G is not present in the corresponding area. In the second determination table TA2, a sub scan 1 indicates an output (ON or OFF) of the first sub scanning sensor 241 and a sub scan 2 indicates an output of the second sub scanning sensor 242. Therefore, the controller 70 may determine the size of the document G, based on whether the document G is present in each of the areas 1 to 4, the output of the first sub scanning sensor 241, and the output of the second sub scanning sensor 242. That is, the controller 70 detects the size (main scanning direction size) of the document G in the main scanning direction X, based on whether the document G is present in each of the areas 1 to 4.

Also in the present embodiment, the controller 70 executes the document size determination process according to the flowchart and the current ratios illustrated in FIGS. 9A and 11C, except that the areas into which the entire scanning area a of the close contact type image sensor 210 is divided and the second determination table TA2 are different.

The present invention is not limited to the embodiments described above, and may be implemented in various other forms. Thus, the embodiments are merely examples in all respects and should not be interpreted in a limiting manner. The scope of the present invention is defined by the claims, and is not restricted by the description of the specification in any way. All modifications and changes belonging to a scope equivalent to the claims are included within the scope of the present invention.

What is claimed is:

1. An image reading device, comprising:
a document platen on which a document is placed;
a document holder that holds the document placed on the document platen;
a plurality of light sources that irradiate the document placed on the document platen with light of different colors; and
a close contact type image sensor,
the image reading device sequentially turning on the plurality of light sources and individually reading, by the close contact type image sensor, light of a plurality of different colors reflected from the document in a main scanning direction, wherein
in a state where the document holder is opened, the image reading device performs an area determination process to determine, in an entire scanning area of the close contact type image sensor, a first scanning area where a difference between output values of the close contact type image sensor when the plurality of light sources are sequentially turned on is within a predetermined threshold value range, and a second scanning area where the difference between the output values of the close contact type image sensor is outside the predetermined threshold value range, and
the image reading device detects a size of the document in the main scanning direction, based on a position of a boundary in the main scanning direction between the first scanning area and the second scanning area determined in the area determination process.

2. The image reading device according to claim 1, further comprising:
an opening and closing sensor that senses opening operation and closing operation of the document holder, wherein
the area determination process is performed if the opening and closing sensor senses opening operation or closing operation of the document holder.

3. The image reading device according to claim 1, wherein
light amounts of the plurality of light sources used in the area determination process is different from light amounts of the plurality of light sources used in normal document reading.

4. The image reading device according to claim 1, wherein
the plurality of light sources are light sources of which light amounts at a same current value are within a first light amount variation range,
the first light amount variation range is a range corresponding to a first reference light amount range between a predetermined first reference light amount and a predetermined second reference light amount smaller than the predetermined first reference light amount, and
the plurality of light sources within the first light amount variation range are turned on with a same current value.

5. The image reading device according to claim 1, wherein
the plurality of light sources are light sources of which light amounts at a same current value are within a second light amount variation range,
the second light amount variation range is a range corresponding to a second reference light amount range larger than a predetermined first reference light amount, and
the plurality of light sources within the second light amount variation range are turned on with different current values from one another.

6. The image reading device according to claim 5, wherein
the close contact type image sensor performs scanning in the main scanning direction a plurality of times, and a current value supplied to the plurality of light sources is changed each time the scanning in the main scanning direction is performed.

7. An image forming apparatus comprising the image reading device according to claim 1.

* * * * *